United States Patent
Jia et al.

(10) Patent No.: US 10,973,000 B2
(45) Date of Patent: Apr. 6, 2021

(54) MESSAGE SENDING METHOD AND APPARATUS

(71) Applicant: HUAWEI TECHNOLOGIES CO., LTD., Guangdong (CN)

(72) Inventors: Xiaoqian Jia, Shanghai (CN); Haiyan Luo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/361,520

(22) Filed: Mar. 22, 2019

(65) Prior Publication Data

US 2019/0223154 A1      Jul. 18, 2019

Related U.S. Application Data

(63) Continuation of application No. PCT/CN2017/102777, filed on Sep. 21, 2017.

(30) Foreign Application Priority Data

Sep. 23, 2016   (CN) .......................... 201610849000.8
Mar. 24, 2017   (CN) .......................... 201710182054.8

(51) Int. Cl.
*H04W 68/02* (2009.01)
*H04W 76/10* (2018.01)
*H04W 76/27* (2018.01)
*H04W 72/12* (2009.01)

(52) U.S. Cl.
CPC ........... *H04W 68/02* (2013.01); *H04W 72/12* (2013.01); *H04W 76/10* (2018.02); *H04W 76/27* (2018.02)

(58) Field of Classification Search
CPC ..... H04W 68/02; H04W 72/12; H04W 76/27; H04W 76/10
See application file for complete search history.

(56) References Cited

U.S. PATENT DOCUMENTS

| | | | |
|---|---|---|---|
| 2006/0056447 | A1 | 3/2006 | Farnsworth et al. |
| 2015/0289244 | A1 | 10/2015 | Liu et al. |
| 2016/0262194 | A1 | 9/2016 | Zhang et al. |
| 2017/0223766 | A1 | 8/2017 | Lin |
| 2018/0213579 | A1* | 7/2018 | Hong .................... H04W 76/12 |
| 2020/0029204 | A1 | 1/2020 | Wang et al. |

FOREIGN PATENT DOCUMENTS

| | | |
|---|---|---|
| CN | 103813423 A | 5/2014 |
| CN | 104335650 A | 2/2015 |
| CN | 106470419 A | 3/2017 |

(Continued)

OTHER PUBLICATIONS

Extended European Search Report issued in European Application No. 17852404.7 dated Jul. 12, 2019, 8 pages.

(Continued)

*Primary Examiner* — Wayne H Cai
(74) *Attorney, Agent, or Firm* — Fish & Richardson P.C.

(57) ABSTRACT

Embodiments of this application provide a message sending method and apparatus. The method includes: receiving, by a distributed node DU, a Radio Resource Control RRC message and indication information that are sent by a central node CU, and sending, by the DU, the RRC message based on the indication information.

15 Claims, 3 Drawing Sheets

A DU receives an RRC message and indication information that are sent by a CU —201

The DU sends the RRC message based on the indication information —202

(56) References Cited

FOREIGN PATENT DOCUMENTS

| | | |
|---|---|---|
| KR | 20170070233 A | 6/2017 |
| WO | 2016061789 A1 | 4/2016 |

OTHER PUBLICATIONS

R3-161810—CMCC, "Discussion of function split between CU/DU ," 3GPP TSG RAN WG3 Meeting #93, Göteborg, Sweden, Aug. 22-26, 2016, 3 pages.

3GPP TS 38.401 V0.2.0 (Jul. 2017);3rd Generation Partnership Project;Technical Specification Group Radio Access Network;NG-RAN; Architecture description(Release 15),total 20 pages.

3GPP TS 36.425 V13.1.1 (Sep. 2016);3rd Generation Partnership Project;Technical Specification Group Radio Access Network;Evolved Universal Terrestrial Radio Access Network(E-UTRAN);X2 interface user plane protocol(Release 13), total 17 pages.

3GPP TS 25.433 V13.3.0 (Jun. 2016);3rd Generation Partnership Project;Technical Specification Group Radio Access Network;UTRAN Iub interface Node B Application Part (NBAP) signalling(Release 13),total 1386 pages.

3GPP TS 36.423 V13.4.0 (Jun. 2016);3rd Generation Partnership Project;Technical Specification Group Radio Access Network;Evolved Universal Terrestrial Radio Access Network(E-UTRAN);X2 application protocol (X2AP)(Release 13), total 238 pages.

NTT DOCOMO,"New SID Proposal: Study on New Radio Access Technology",3GPP TSG RAN Meeting #71 RP-160671,Göteborg, Sweden, Mar. 7-10, 2016,total 8 pages.

International Search Report and Written Opinion issued in International Application No. PCT/CN2017/102777 dated Nov. 29, 2017, 12 pages.

InterDigital Communication, "Fronthauling with New Radio Technology," 3GPP TSG-RAN WG2 #93bis, R2-162826; Dubrovnik, Croatia, Apr. 11-15, 2016, 7 pages.

Office Action issued in Chinese Application No. 201710182054.8 dated Mar. 19, 2020, 10 pages.

NEC (Temporary Rapporteur), "Update of TR 38.801 (v040)," 3GPP TSG RAN WG3 #93, R3-161962; Göteborg, Sweden, Aug. 22-28, 2016, 38 pages.

Huawei, "SRB type identification over F1 and X2 interface for CU-DU," 3GPP TSG RAN WG3 #97, R3-173132; Berlin, Germany, Aug. 21-25, 2017, 3 pages.

Intel Corporation, "Discussion on bearer split for SRB," 3GPP TSG RAN WG2 #84 ,R2-134404; San Francisco, USA, Nov. 11-15, 2013, 3 pages.

Office Action issued in Japanese Application No. 2019-515932 dated Apr. 7, 2020, 8 pages (with English translation).

Catt, "Consideration on RAN interface for NR," 3GPP TSG RAN WG3 Meeting #92, R3-161155, Nanjing, China, May 23-27, 2016, 5 pages.

Office Action issued in Korean Application No. 2019-7011212 dated Jul. 15, 2020, 8 pages (with English translation).

Office Action issued in Korean Application No. 2019-7011212 dated Jan. 25, 2021, 7 pages (with English translation).

* cited by examiner

MESSAGE SENDING METHOD AND APPARATUS

CROSS-REFERENCE TO RELATED APPLICATIONS

This application is a continuation of International Application No. PCT/CN2017/102777, filed on Sep. 21, 2017, which claims priority to Chinese Patent Application No. 201610849000.8, filed on Sep. 23, 2016, and Chinese Patent Application No. 201710182054.8, filed on Mar. 24, 2017. All of the aforementioned patent applications are hereby incorporated by reference in their entireties.

TECHNICAL FIELD

Embodiments of this application relate to computer technologies, and in particular, to a message sending method and apparatus.

BACKGROUND

A cloud radio access network (Cloud Radio Access Network, CRAN for short) has advantages such as fewer building baseband units (Building Baseband Unit, BBU for short), sharing gains of a BBU resource pool, better support for sharing a residential access network (Residential Access Network, RAN for short) among different operators, and power saving. Therefore, in-depth research has been carried out on a CRAN in the 5th generation mobile communications technology (the 5th Generation mobile communications technology, 5G for short).

A CRAN includes a central node (Central Unit, CU for short) and a distributed node (Distributed Unit, DU for short). One CU may be connected to one or more DUs. FIG. 1 is a schematic diagram of CU-DU split at protocol layers. As shown in FIG. 1, the current $3^{rd}$ Generation Partnership Project ($3^{rd}$ Generation Partnership Project, 3GPP for short) standards propose different CU-DU functional split solutions shown in FIG. 1 in a CRAN architecture. Based on a current protocol stack, a CU and a DU are split at a Radio Resource Control (Radio Resource Control, RRC for short) layer, a Packet Data Convergence Protocol (Packet Data Convergence Protocol, PDCP for short) layer, a Radio Link Control (Radio Link Control, RLC for short) layer, a Media Access Control (Media Access Control, MAC for short) layer, and a physical layer (Physical Layer, PHY for short) layer in options (Option) 1, 2, 4, 6, and 8. In split solutions in the options (Option) 3, 5, and 7, functions of an RLC part and a layer higher than the RLC layer, functions of a MAC part and a layer higher than the MAC layer, or functions of a PHY layer part and a layer higher than the PHY layer are allocated to the CU.

In the foregoing split manners, functions at the RRC layer are located at the CU. How to send an RRC message becomes a technical problem that needs to be resolved urgently at present.

SUMMARY

Embodiments of this application provide a message sending method and apparatus, to send an RRC message. In addition, the solution of this application may be alternatively applied to a message at another layer.

According to a first aspect, an embodiment of this application provides a message sending method, including:

receiving, by a distributed node (DU), a first message and indication information from a central node (CU); and sending, by the DU, the first message based on the indication information.

Optionally, the indication information includes a first message type of the first message. The first message type is a master information block message, a system information block type 1 message, a paging message, a minimum system information message, a system information message, or an other-system-information message. The first message type is associated with first scheduling information. The sending, by the DU, the first message based on the indication information is: sending, by the DU, the first message based on the first message type and the first scheduling information. Optionally, the first scheduling information may be sent by the CU to the DU or may be regulated in a communications standard.

Optionally, the indication information includes first scheduling information of the first message and a first message type of the first message. The first message type is a system information message or an other-system-information message. The sending, by the DU, the first message based on the indication information is: sending, by the DU, the first message based on the first message type and the first scheduling information. The method further includes: receiving, by the DU, a second message and a second message type of the second message from the CU, where the second message type is a system information block type 1 message or a minimum system information message, and the second message includes the first scheduling information; and sending, by the DU, the second message based on the second message type and second scheduling information associated with the second message type.

Optionally, the method further includes: receiving, by the DU, a first request message from one or more terminals, where the first request message includes the first message type; and sending, by the DU, a second request message to the CU, where the second request message includes the first message type.

Optionally, a quantity of the first request messages meets a threshold condition.

Optionally, the method further includes: receiving, by the DU, the threshold condition from the CU.

Optionally, the indication information further includes a cell identifier or a network standard. The sending, by the DU, the first message based on the first message type and the first scheduling information is: sending, by the DU based on the first message type and the first scheduling information, the first message in a cell corresponding to the cell identifier; or, sending, by the DU, the first message based on the first message type and the first scheduling information and by using a wireless technology corresponding to the network standard.

Optionally, the first scheduling information includes validity information, a scheduling period, or a scheduling window.

Optionally, the indication information includes a first message type of the first message and a terminal identifier, and the first message type is a signaling radio bearer 1 message, a signaling radio bearer 2 message, a system information message, or an other-system-information message. The sending, by the DU, the first message based on the indication information is: sending, by the DU, the first message based on the first message type and the terminal identifier.

Optionally, the method further includes: sending, by the DU, a setup request message of a tunnel to the CU, where the setup request message includes a first message type of the first message and a terminal identifier; the indication information includes an identifier of the tunnel. The sending, by the DU, the first message based on the indication information is: sending, by the DU, the first message based on the first message type and the terminal identifier.

Optionally, the method further includes: sending, by the DU, a setup request message of a tunnel to the CU, where the setup request message includes a terminal identifier; the indication information includes an identifier of the tunnel and a first message type of the first message. The sending, by the DU, the first message based on the indication information is: sending, by the DU, the first message based on the first message type and the terminal identifier.

Optionally, the indication information further includes a cell identifier or a network standard. The sending, by the DU, the first message based on the first message type and the terminal identifier is: sending, by the DU based on the first message type and the terminal identifier, the first message in a cell corresponding to the cell identifier; or, sending, by the DU, the first message based on the first message type and the terminal identifier and by using a wireless technology corresponding to the network standard.

According to a second aspect, an embodiment of this application further provides a message sending method, including: obtaining, by a central node CU, indication information associated with a first message, where the indication information is used to send the first message; and sending, by the CU, the first message and the indication information to a distributed node DU.

Optionally, the indication information includes a first message type of the first message. The first message type is a master information block message, a system information block type 1 message, a paging message, a minimum system information message, a system information message, or an other-system-information message. The first message type is associated with first scheduling information of the first message.

Optionally, the method further includes: sending, by the CU, the first scheduling information to the DU.

Optionally, the indication information includes first scheduling information of the first message and a first message type of the first message. The first message type is a system information message or an other-system-information message. The method further includes: sending, by the CU, a second message and a second message type of the second message to the DU, where the second message type is a system information block type 1 message or a minimum system information message, and the second message includes the first scheduling information.

Optionally, the method further includes: receiving, by the CU, a second request message from the DU, where the second request message includes the first message type.

Optionally, the method further includes: sending, by the CU, a threshold condition associated with the second request message to the DU.

Optionally, the first scheduling information includes validity information, scheduling information, or a scheduling window.

Optionally, the indication information includes a first message type of the first message and a terminal identifier, and the first message type is a signaling radio bearer 1 message, a signaling radio bearer 2 message, a system information message, or an other-system-information message.

Optionally, the method further includes: receiving, by the CU, a setup request message of a tunnel from the DU, where the setup request message includes a first message type of the first message and a terminal identifier, and the indication information includes an identifier of the tunnel.

Optionally, the method further includes: receiving, by the CU, a setup request message of a tunnel from the DU, where the setup request message includes a terminal identifier, and the indication information includes an identifier of the tunnel and a first message type of the first message.

Optionally, the indication information further includes a cell identifier or a network standard.

According to a third aspect, an embodiment of this application further provides a node. The node is configured to implement, for example, the message sending method in the first aspect.

Optionally, the node may be a DU.

In an optional design, the node includes a processor, a transceiver, and a communications circuit. The processor is configured to: receive a first message and indication information from a central node CU by using the communications circuit, and send the first message based on the indication information.

In another optional design, the node includes a processor and a memory. The memory is configured to store a program for implementing the method in the first aspect. The processor is configured to execute the foregoing program to implement the method in the first aspect.

For how the node implements the method in the first aspect, refer to the content of the first aspect.

According to a fourth aspect, an embodiment of this application further provides another node. The node is configured to implement, for example, the message sending method in the second aspect. Optionally, the node may be a CU.

In an optional design, the node includes a processor and a communications circuit. The processor is configured to obtain indication information associated with a first message, where the indication information is used to send the first message. The processor sends the first message and the indication information to a distributed node DU by using the communications circuit.

In another optional design, the node includes a processor and a memory. The memory is configured to store a program for implementing the method in the second aspect. The processor is configured to execute the foregoing program to implement the method in the second aspect.

For how the node implements the method in the second aspect, refer to the content of the second aspect.

According to a fifth aspect, an embodiment of this application further provides a communications system, including the node in the third aspect and the node in the fourth aspect.

According to a sixth aspect, an embodiment of this application further provides a computer program product, where the program product includes a program used to implement the method in the first aspect.

According to a seventh aspect, an embodiment of this application further provides a computer readable storage medium, where the medium stores the program in the sixth aspect.

According to an eighth aspect, an embodiment of this application further provides a computer program product, where the program product includes a program used to implement the method in the second aspect.

According to a ninth aspect, an embodiment of this application further provides a computer readable storage medium, where the medium stores the program in the eighth aspect.

Other embodiments provided in this application are described below.

According to a first aspect, an embodiment of this application provides a Radio Resource Control RRC message sending method, including:

receiving, by a distributed node DU, a Radio Resource Control RRC message and indication information that are sent by a central node CU; and sending, by the DU, the RRC message based on the indication information.

In the Radio Resource Control RRC message sending method provided in the first aspect, the DU receives the RRC message and the indication information that are sent by the CU, and sends the RRC message based on the indication information. After receiving the RRC message and the indication information, the DU may send the RRC message based on the indication information, so that the DU can send RRC control signaling to UE correctly.

In a possible design, the indication information includes a message type, and the message type is used to indicate a message type of the RRC message; and the sending, by the DU, the RRC message based on the indication information includes:

broadcasting, by the DU, the RRC message based on the message type.

In the aspect, the DU can know, based on the message type, an occasion of sending the RRC message, and therefore, broadcast the RRC message correctly. A terminal can therefore receive the RRC message correctly.

In a possible design, the indication information may further include a cell identifier, so that after receiving the indication information, the DU may broadcast the RRC message in a cell corresponding to the cell identifier. In the design, the DU may correspond to a plurality of cells.

In a possible design, the indication information further includes network standard indication information, and the network standard indication information is used to indicate a standard type of a radio access network over which the RRC message is sent. After receiving the indication information, the DU can broadcast the RRC message based on the standard type of the radio access network. In the design, the DU can support various access technologies such as a CDMA technology, a UMTS technology, an LTE technology, or a 5G access technology.

In the Radio Resource Control RRC message sending method provided in the possible designs, after receiving the message type sent by the CU, the DU may broadcast, based on a scheduling period corresponding to the message type, a cell-level RRC message to UE in the cell, thereby resolving a problem that the DU cannot identify a message sent by the CU and as a result does not know how to process the message, so that the DU can transmit RRC control signaling to the UE correctly.

In a possible design, the indication information includes signaling radio bearer SRB identifier information and terminal device identifier information. The SRB identifier information may also be understood as type information of an SRB, and is, for example, an SRB0, an SRB1, an SRB2, and an SRB3. The SRB identifier information may be extended into an SRB identifier such as an SRB1S or an SRB2S in new 5G standards.

The sending, by the DU, the RRC message based on the indication information includes:

sending, by the DU, the RRC message to a corresponding terminal based on the SRB identifier information and the terminal device identifier information. For example, the DU may find, based on the SRB identifier information and the terminal device identifier information, a corresponding PDCP entity/RLC entity to process the RRC message (in other words, perform corresponding processing on the RRC message at a PDCP/RLC layer), and can send the RRC message to a terminal device through a corresponding logic channel. It may be understood that the terminal device identifier information may be an interface UE identifier that is between the CU and the DU and that is used by the CU and the DU to identify the UE on an interface. The DU maintains a relationship between the interface UE identifier and a UE identifier such as a C-RNTI inside the DU, and the DU finds the corresponding UE based on the terminal device identifier information. The RLC entity corresponding to the UE is then found based on the SRB identifier information. The RRC message is delivered to the RLC entity for processing, and then sent into a MAC/PHY layer for processing. The RRC message is eventually sent to the terminal through an air interface. In addition, in a PDCP-RLC split manner between the CU and the DU, the CU includes an RRC layer and a PDCP layer, and the DU includes an RLC layer, a MAC layer, and a PHY layer. The DU finds, based on the terminal device identifier information and the SRB identifier information, the RLC entity of the corresponding UE for processing. For the content about the PDCP entity (processing at the PDCP layer), the RLC entity (processing at the RLC layer), how to map the logic channel to a transmission channel, how to map the transmission channel to a physical channel, and the like, refer to related content in, for example, Sections 5 and 6 in the 3GPP standard TS 36.300 v13.1.0.

In the method provided in the possible design, after receiving the SRB identifier information and the terminal device identifier information that are sent by the CU, the DU can find, based on the SRB identifier information and the terminal device identifier information, a corresponding logic channel for sending to the corresponding terminal.

According to a second aspect, an embodiment of this application provides a Radio Resource Control RRC message sending method, including:

receiving, by a distributed node DU through a user plane tunnel, a Radio Resource Control RRC message sent by a central node CU, where the user plane tunnel has an association relationship with a message type of the RRC message and a terminal; and sending, by the DU, the RRC message to the terminal corresponding to the user plane tunnel. For example, the user plane tunnel has an tunnel endpoint identifier TEID. The DU may obtain a corresponding message type (for example, an SRB1) and a terminal identifier based on the TEID, find a corresponding PDCP/RLC entity to process the RRC message (in other words, perform corresponding processing on the RRC message at a PDCP/RLC layer), and can send the RRC message to the terminal through a corresponding logic channel. In other words, the DU may obtain a corresponding message type (for example, an SRB1) and a terminal identifier based on the TEID and find a corresponding logic channel to send the RRC message to the corresponding terminal.

In the Radio Resource Control RRC message sending method provided in the second aspect, the DU receives, through the user plane tunnel, the RRC message sent by the CU, performs corresponding processing on the RRC message based on the association relationship between the user plane tunnel and the message type of the RRC message and a terminal device, and sends the RRC message to the corresponding terminal.

In a possible design, before the receiving, by a distributed node DU, an RRC message sent by a central node CU, the method further includes:

receiving, by the DU, a bearer setup request message sent by the CU, where for example, the bearer setup request message may include a message type A and a terminal identifier B; in other words, by using the RRC message sent through the user panel tunnel, the DU may consider that the message type of the RRC message is the message type A and the RRC message is to be sent to a terminal identified by the terminal identifier B; and therefore, corresponding processing may be performed on the RRC message, and the RRC message is sent to the corresponding terminal; and establishing, by the DU, the user plane tunnel between the DU and the CU based on the bearer setup request message; in other words, the DU sends a response message to the CU, where the response message may include a tunnel endpoint identifier TEID on a DU side.

In the method provided in the possible design, the DU sends the bearer setup request message to the CU, to establish the user plane tunnel before sending the RRC message, so that the message type of the RRC message and the terminal that needs to receive the RRC message can be identified correctly by using the RRC message sent through the user plane tunnel, thereby ensuring that the RRC message is correctly sent.

According to a third aspect, an embodiment of this application provides a distributed node DU, including:

a receiver, configured to receive a Radio Resource Control RRC message and indication information that are sent by a central node CU; and a transmitter, configured to send the RRC message based on the indication information.

In a possible design, the indication information includes a message type and a cell identifier, and the message type is used to indicate a message type of the RRC message; and the transmitter is further configured to broadcast, based on the cell identifier and the message type, the RRC message in a cell corresponding to the cell identifier.

In a possible design, the indication information further includes network standard indication information, and the network standard indication information is used to indicate a standard type of a radio access network over which the RRC message is sent.

In a possible design, the indication information includes signaling radio bearer SRB identifier information and terminal device identifier information; and the transmitter is further configured to send, based on the SRB identifier information and the terminal device identifier information, the RRC message to a terminal device corresponding to the terminal device identifier information.

In an optional design, the DU may include a processor, a transceiver, and a communications circuit. The processor is configured to: receive, by using the communications circuit, the RRC message and the indication information that are sent by the CU, and send, by using the transceiver, the RRC message based on the indication information. For specific content about how the DU sends the RRC message, refer to the content of the first aspect in the other embodiments described above.

For beneficial effects of the DU provided in the third aspect and the possible designs of the third aspect, refer to beneficial effects produced by the first aspect and the possible designs of the first aspect. Details are not described herein again.

According to a fourth aspect, an embodiment of this application provides a distributed node DU, including:

a receiver, configured to receive, through a user plane tunnel, a Radio Resource Control RRC message sent by a central node CU;

a transmitter, configured to send the RRC message to a terminal corresponding to the user plane tunnel, where in a possible design, the receiver is further configured to receive a bearer setup request message sent by the CU; and a processor, configured to establish the user plane tunnel between the DU and the CU based on the bearer setup request message.

In an optional design, the DU includes a processor, a transceiver, and a communications circuit. The processor is configured to: receive, through the user plane tunnel by using the communications circuit, the RRC message sent by the CU, and send, by using the transceiver, the RRC message to the terminal corresponding to the user plane tunnel. For specific content about how the DU sends the RRC message, refer to the content of the second aspect in the other embodiments described above.

For beneficial effects of the DU provided in the fourth aspect and the possible designs of the fourth aspect, refer to beneficial effects produced by the second aspect and the possible designs of the second aspect. Details are not described herein again.

The transceiver and the communications circuit may be implemented in one physical device, for example, a board. The physical device may be referred to as a transceiver unit, a communications unit, or the like.

DESCRIPTION OF EMBODIMENTS

Figure 1:
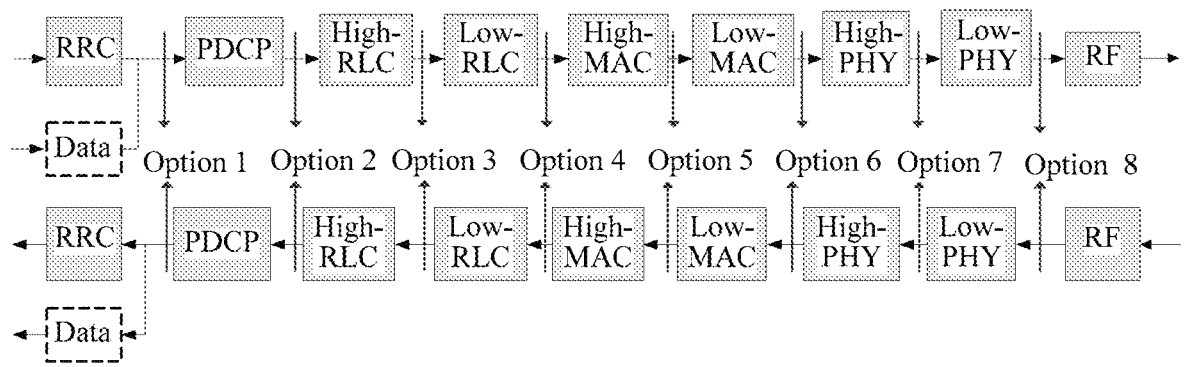
FIG. 1 is a schematic diagram of CU-DU split at protocol layers.

The technology described herein may be used in various communications systems such as current 3G and 4G communications systems and next-generation communications systems, for example, a Global System for Mobile Communications (Global System for Mobile communications, GSM for short), a code division multiple access (Code Division Multiple Access, CDMA for short) system, a time division multiple access (Time Division Multiple Access, TDMA for short) system, a wideband code division multiple access (Wideband Code Division Multiple Access, WCDMA for short) system, a frequency division multiple access (Frequency Division Multiple Access, FDMA for short) system, an orthogonal frequency division multiple access (Orthogonal Frequency Division Multiple Access, OFDMA for short) system, a single-carrier FDMA (SC-FDMA) system, a general packet radio service (General Packet Radio Service, GPRS for short) system, a Long Term Evolution (Long Term Evolution, LTE for short) system, a 5G communications system (for example, an NR (New Radio, New Radio) system), a communications system that combines various communications technologies (for example, a communications system that combines an LTE technology and an NR technology), and another communications system of this type.

In this application, a terminal may sometimes be referred to as a terminal device or a terminal apparatus.

In this application, functions of protocol layers of a CU and a DU may be split according to an actual requirement. During implementation, the CU and the DU may have processing functions of complete protocol layers, including, for example, an RRC layer, a PDCP layer, an RLC layer, a MAC layer, and a physical layer. During deployment, some base stations may be configured to enable a processing function of the RRC layer, and such base stations may be considered as CUs. Some base stations are configured to enable processing functions of a PDCP layer and lower layers, and these base stations may be considered as DUs. A CU and a DU are names of base stations that have functions of different protocol layers, and other names may be used in the communications field.

In this application, a base station is an access network device. Different names are used in different networks. For example, a base station may be referred to as a TRP (a transmission reception point), a microcell, a small cell, a macrocell, a high frequency base station, a low frequency base station, or the like in a 5G network.

In this application, messages have different message types. For example, in one type of message classification, a message may be an MIB message, an SIB1 message, a paging message, a minimum SI message, an SI message, an other-SI message or an SIB2 message. The SIB1 message and the SIB2 message may be generally referred to as an SIB message. Sometimes, the SIB1 and the SIB2 may be referred to as an SIB message identifier, or "1" and "2" in the SIB1 and the SIB2 may be referred to as an SIB message identifier. In an example, in an LTE system, system messages may include an MIB message, an SIB1 message, and an SI message. The MIB message includes downlink system bandwidth, a PHICH configuration, and SFN information. The SIB1 message may specify which SI messages exist, a period of each SI message, and which SIBs are included in each SI message. The SI message includes, in addition to an SIB1, other SIBs having a same scheduling requirement (transmission period). In another example, in a 5G system (an NR system), system messages may include a minimum SI message and an other-SI message. The minimum SI message may be understood as a message type that carries system information required in a communications system, for example, a message sent at regular intervals by the communications system according to an agreement, so that the terminal can discover or access the communications system. The other-SI message is relative to the minimum SI message, and may be understood as an SI message other than the minimum SI message. Optionally, the other-SI message may further include different types, for example, other SI1, other S12, and other SI3. In an example, the system messages in the LTE system and the system messages in the 5G system may coexist in one communications system. In an example, scheduling information of the MIB message, the SIB1 message, the paging message, the minimum SI message, the SI message, and the other-SI message may be agreed upon in advance, for example, regulated in a communications standard. In another example, scheduling information of the SI message and the other-SI message may be notified over a network to the terminal, for example, notified by a base station to the terminal.

In this application, the word "message" in the MIB message, the SIB1 message, the SIB message, the SI message, the SRB message, or the like may be sometimes omitted, so that the MIB message, the SIB1 message, the SIB message, the SI message, and the SRB message are referred to as an MIB, an SIB1, an SIB, SI, and an SRB respectively for short.

In this application, a protocol layer is sometimes referred to as a layer. For example, an RRC protocol layer may be referred to as an RRC layer.

In this application, a scheduling period may be sometimes referred to as a sending period.

In this application, network standard information may be referred to as a network standard for short.

In this application, an identifier of a tunnel may be an tunnel endpoint identifier of the tunnel, for example, an endpoint identifier of a tunnel on a CU side or an endpoint identifier of a tunnel on a DU side.

The technical solution in this application not only can be applied to an RRC message, but also can be applied to a message of another protocol layer as a communications protocol layer changes. Messages at an RRC protocol layer are used as an example for description. The messages at the RRC protocol layer may be referred to as RRC messages.

Figure 2:
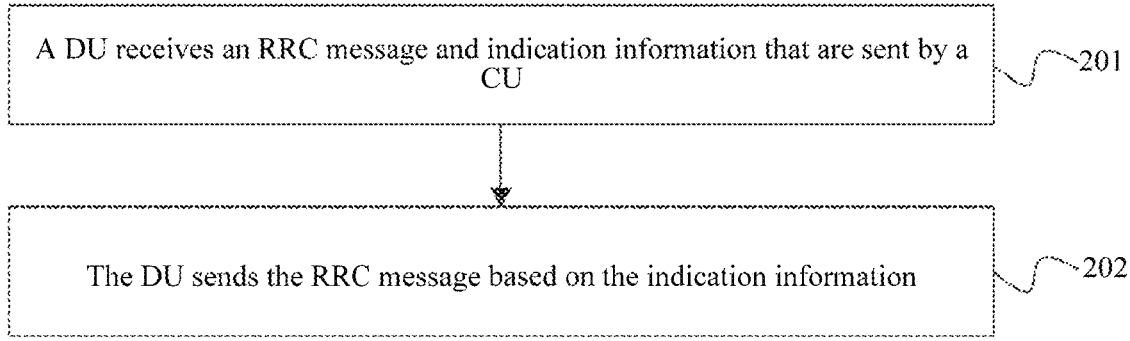
FIG. 2 is a schematic flowchart of Embodiment 1 of a Radio Resource Control RRC message sending method according to this application.

FIG. 2 is a schematic flowchart of Embodiment 1 of a Radio Resource Control RRC message sending method according to this application. The method shown in FIG. 2 may also be considered as a message sending method. This embodiment of this application provides the Radio Resource Control RRC message sending method. The method may be performed by any apparatus that performs the Radio Resource Control RRC message sending method. The apparatus may be implemented by using software and/or hardware. In this embodiment, the apparatus may be integrated into a DU. As shown in FIG. 2, the method in this embodiment may include the following steps.

Step 201: A DU receives an RRC message and indication information that are sent by a CU.

In other words, the DU receives a first message and the indication information from the CU.

Step 202: The DU sends the RRC message based on the indication information.

In other words, the DU sends the first message based on the indication information.

In this embodiment, a CU-DU interface is introduced in a CRAN architecture. Therefore, a problem to be resolved is how the DU identifies a message sent by the CU and sends the message to a terminal correctly. In this embodiment, after receiving the indication information and the message such as a Radio Resource Control (Radio Resource Control, RRC for short) message that are sent by the CU, the DU may learn of, based on the indication information, a manner of sending the message. Therefore, the DU can send the message out correctly. For example, the DU sends the message to user equipment (User Equipment, UE for short). In an example of an implementation, in a Packet Data Convergence Protocol (Packet Data Convergence Protocol, PDCP)/Radio Link Control (Radio Link Control, RLC) split manner, the CU has an RRC layer and a PDCP layer, and the DU has an RLC/Media Access Control (Media Access Control, MAC)/physical layer (Physical Layer, PHY). In this case, a specific format of the RRC message sent by the CU to the DU should be a PDCP/RRC message (this part is used as a payload transmitted through the CU-DU interface, for example, when the message is transmitted through the CU-DU interface, a CU-DU interface protocol layer that may be a CU-DU interface control plane protocol layer or a CU-DU interface user plane protocol layer, namely, an SCTP layer, a GTP-U layer, or the like may further need to be added). In an example, a format of the RRC message sent by the CU to the DU may be as follows:

| PDCP   | RRC     |
|--------|---------|
| header | message |

It may be understood that a CU-DU control plane protocol or user plane protocol may be used to transmit the RRC message between the CU and the DU.

After receiving the RRC message, the DU first removes the CU-DU interface protocol layer, performs parsing to obtain a payload, to be specific, the PDCP/RRC message, then encapsulates the PDCP/RRC message into a PHY/MAC/RLC/PDCP/RRC message, and sends the PHY/MAC/RLC/PDCP/RRC message to the UE. In an example, the encapsulated RRC message may be as follows:

| PHY    | MAC    | RLC    | PDCP   | RRC     |
|--------|--------|--------|--------|---------|
| header | header | header | header | message |

In addition, an indication message sent by the CU to the DU can be directly parsed by the DU. For example, an information element or a field in an SCTP data packet or a GTP-U data packet carries the indication message or is used as the indication information.

It may be understood that the DU receives the RRC message and the indication information that are sent by the CU, and a specific format during transmission according to the CU-DU control plane protocol may be, for example, as follows:

| Terminal device identifier information |
|----------------------------------------|
| SRB identifier information             |
| RRC message                            |

In another example, an RRC/PDCP layer split manner, to be specific, a split manner of the option 1 in FIG. 1, may be used. In the split manner, the CU supports an RRC layer, and the DU supports a PDCP layer and lower protocol layers. The RRC message sent by the CU to the DU is a payload (payload) of the PDCP layer for the DU. The DU does not support an RRC layer protocol. As a result, the DU cannot learn of the content sent by the CU to the DU, and therefore cannot correctly send, to the terminal, the RRC message sent by the CU to the DU. The CU may add the indication information to an interface message or an interface data packet between the CU and the DU.

Optionally, the indication information may include a message type, and the message type is a message type of the first message. The message type may be associated with scheduling information. To be specific, any message of the message type can be scheduled by using the scheduling information. An association relationship between the scheduling information and the message type may be regulated in a communications standard or may be specified by a network device and sent to the terminal. When the message type is delivered, the scheduling information of the message is indicated to the DU. Therefore, the DU can send the message correctly.

For example, a first message type may be an MIB message, an SIB1 message, an SI message, a paging message, a minimum SI message, and an other-SI message. Scheduling information of the MIB message, the SIB1 message, the SI message, the paging message, the minimum SI message, and the other-SI message may be agreed upon in advance, for example, may be regulated in a communications standard or may be sent by the CU to the DU. Therefore, after learning of the message type of the message, the DU learns of the scheduling information corresponding to the message. Herein, the message type of the first message is associated with the scheduling information.

For another example, the first message type may be an SI message or an other-SI message. Scheduling information corresponding to the SI message or the other-SI message may be sent to the terminal by a base station, for example, by using an MIB message, an SIB1 message or a minimum SI message.

For another example, the first message type may be an SRB1 message, an SRB2 message, an SI message, or an other-SI message. The foregoing message may be sent to a specific terminal. A signaling bearer may be established between the terminal and the DU. One signaling bearer usually has an association relationship with a specific terminal and a specific message type. The indication information may further include a terminal identifier. Therefore, after learning of a message type of the message and a corresponding terminal identifier, the DU may send the message to the UE on a corresponding signaling bearer. Specifically, a network side establishes a corresponding PDCP entity and RLC entity for each bearer of the terminal, the DU may send, by using the message type and the terminal identifier, the message to the corresponding PDCP entity or RLC entity to perform corresponding processing, and a bearer and a logic channel are in a one-to-one correspondence. The DU may send the message on a physical resource corresponding to the logic channel, so that the message can be sent to the corresponding terminal correctly.

In a variant, the message type or the terminal identifier in the indication information may be replaced with other information. For example, after a tunnel is established for the terminal, messages of the terminal are all sent through the tunnel, and an identifier of the tunnel may be used to indicate an identifier of the terminal of a user. For another example, after a tunnel is established for the message type of the terminal, messages of the message type of the user are all sent through the tunnel, and an identifier of the tunnel may be used to indicate the message type and the terminal identifier.

Optionally, the scheduling information is mainly used to indicate an occasion of sending a message. For example, the scheduling information may include a scheduling period or a scheduling window. Optionally, the scheduling information may further include validity information.

In the message sending method provided in this embodiment of this application, the indication information can help the DU to identify how to correctly send a message sent by the CU to the DU. In an example, in the Radio Resource Control RRC message sending method provided in this embodiment of this application, the RRC message and the indication information that are sent by the CU are received, and the RRC message is sent based on the indication information. After receiving the RRC message and the indication information, the DU may send the RRC message based on the indication information, so that the CU can transmit RRC control signaling to the DU correctly.

It should be noted that this embodiment and the following embodiments are described only by using the RRC message as an example. During actual application, the DU may further receive messages that are of other high layers and that are sent by the CU. Herein, a high layer means a protocol layer that is supported by the CU but that cannot be identified by the DU. In addition, protocol layers supported by the DU and the CU change and split of protocol layers changes with development of network technologies. In a new network environment, when the DU receives, from the CU, a message of a high layer that is not supported by the DU, the method provided in this embodiment of this application may be used to transmit the message of the high layer.

Some discussions about the embodiment shown in FIG. 2 are provided below.

Generally, messages may include a cell-level message and a user-level message. The cell-level message is a message broadcast in a cell but is not a message for a specific user. To be specific, the message is oriented to terminal devices in the cell. The user-level message is a message sent for a specific user. For example, RRC messages include a cell-level RRC message and a user-level RRC message.

A cell-level message is described below by using an example.

Specifically, a person skilled in the art may understand that, to ensure transmission reliability, cell-level signaling may be transmitted according to a transport layer protocol in a control plane, namely, Stream Control Transmission Protocol (Stream Control Transmission Protocol, SCTP for short). Because the CU and the DU are two entities in a CRAN, the indication information needs to be transferred through an interface. Therefore, a cell-level RRC message needs to use a CU-DU interface to indicate a message type and a cell identifier.

For an RRC message, a cell-level RRC message includes a master information block (master information block, MIB for short) message and a system information block (System information block, SIB for short) message. The SIB message may further include an SIB1 message and an SI message. In a specific example, a paging (Paging) message is used for paging a specific user but can still be considered as a cell-level message. In a specific example, SI messages such as an SIB2, an SIB3, . . . , and an SIB23 and other-SI messages can be considered as both cell-level messages and user-level messages. The SIB message may further include messages such as an SIB1, an SIB2, an SIB3, . . . , and an SIB23. The SIB2, the SIB3, . . . , and the SIB23 may be referred to as SI messages. To be specific, the SIB message may include the SIB1 message and the SI message. The MIB message and the SIB message (the SIB1 message and the SI message) may be referred to as system messages. For example, in an LTE system, a sending period of the MIB is 40 ms, a sending period of the SIB1 is 80 ms, and SIB messages following the SIB2 have different periods. The periods of the SIB messages following the SIB2 may be provided in the SIB1. In another example, a cell-level RRC message may include a minimum SI message, an other-SI message, and a paging message. A sending period of the minimum SI message may be agreed upon in advance. A sending period of the other-SI message may be specified by the minimum SI. For example, the cell-level RRC message may use a CU-DU interface message to indicate a type of an SIB to enable the DU to learn of the type of the SIB.

Because cell-level messages have different scheduling requirements, the CU may send a cell-level message to the DU in the following manners:

In a first optional manner, the CU sends the cell-level message and the message type (where the message type may be considered as indication information) to the DU based on scheduling information of the cell-level message. After receiving the cell-level message, the DU sends, based on the message type, the cell-level message on a corresponding channel (where a channel has an association relationship with time and frequency resources). For example, the DU sends the MIB message on a physical broadcast channel (Physical Broadcast Channel, PBCH) and sends other messages on a physical downlink shared channel (Physical Downlink Shared Channel, PDSCH). In the manner, an occasion of scheduling the cell-level message is triggered by the CU for the DU. The DU does not need to configure the scheduling information of the cell-level message. After receiving the message sent by the CU, the DU may send the cell-level message immediately or after an agreed time.

In the second optional manner, the CU sends the cell-level message and the scheduling information corresponding to the cell-level message to the DU. After receiving the cell-level message, the DU sends the cell-level message based on the scheduling information. The CU may not need to send the cell-level message to the DU each time. The CU sends an updated cell-level message to the DU through an interface only when the cell-level message changes. In this way, interactions between the CU and the DU can be reduced greatly. For a paging message, the CU usually sends the paging message directly after receiving the paging message.

In a variant of the second manner, the scheduling information may be replaced with other information that has an association relationship with the scheduling information. For example, when a correspondence between the message type and the scheduling information is configured on the DU, a message type of a cell-level message may be sent to the DU and the DU learns of the scheduling information of the cell-level message. The correspondence between the message type and the scheduling information may be configured for the DU by the CU or may be agreed upon in a communications standard.

In the second manner and the variant of the second manner, if the scheduling information of the cell-level message is not regulated in a communications standard, a terminal cannot know how to receive the cell-level message. Therefore, a network side further needs to notify the terminal of the scheduling information. In an example, the scheduling information may be carried in an SIB1 message or a minimum SI message and sent to the terminal. Because the terminal knows scheduling information of the SIB message or the minimum SI message in advance, the terminal can receive the scheduling information correctly, to receive the subsequent cell-level message.

As discussed above, the scheduling information is mainly used to indicate an occasion of sending a message. For example, the scheduling information may include a scheduling period or a scheduling window. Optionally, the scheduling information may further include validity information. The scheduling period and the scheduling window information are used to determine a subframe from which the cell-level message is to be read. A change of validity information represents a change of a system message. The scheduling window and the scheduling period may restrict the UE to reading the system message within the scheduling window, thereby reducing energy consumption of the UE. It should be noted that when the CU sends a latest cell-level message to the DU, the DU receives the cell-level message and learns that the cell-level message changes. In this case, the CU may directly replace the cell-level message with the latest cell-level message, and the scheduling information may not include validity information. In addition, if the scheduling information includes validity information, when the DU receives the validity information and finds that the validity information is different from locally saved validity information, the DU may learn that the cell-level message changes. In this case, the DU updates the cell-level message based on the validity information sent by the CU. In addition, when the cell-level message changes, the CU may use a paging message to notify the UE that the cell-level message changes.

In conclusion, this embodiment of this application provides a message sending method, including:

sending, by a CU, a first message and indication information to a DU; and sending, by the DU, the first message based on the indication information.

In a first optional design, the indication information includes a first message type of the first message. The first message type may be an MIB message, an SIB1 message, an SI message, a paging message, a minimum SI message, or an other-SI message. The first message type is associated with first scheduling information. The sending, by the DU, the first message based on the indication information is: sending, by the DU, the first message based on the first message type and the first scheduling information.

For example, if the message type is an MIB message, the MIB message is sent on a PBCH based on a period of 40 ms. If the message type is an SIB1 message, the SIB1 message is sent on a PDSCH based on a period of 80 ms.

In a second optional design, the indication information includes first scheduling information of the first message and a first message type of the first message. The first message type is an SI message or an other-SI message. The sending, by the DU, the first message based on the indication information is: sending, by the DU, the first message based on the first message type and the first scheduling information. The method further includes: receiving, by the DU, a second message and a second message type of the second message from the CU, where the second message type is an SIB1 message or a minimum SI message, and the second message includes the first scheduling information; and sending, by the DU, the second message based on the second message type and second scheduling information associated with the second message type. The second message is sent to enable a terminal to learn of the scheduling information of the first message, to correctly receive the first message.

For example, the CU may send a message A and a message type A to the DU. The message type A is a minimum SI message, and the message A includes scheduling information B of a message B. After receiving the message A and the message type A, the DU sends the message A based on scheduling information of the minimum SI message and the message type A. The CU may send the message B and indication information B to the DU. The indication information B includes the scheduling information B and a message type B of the message B. After receiving the message B and the indication information B, the DU sends the message B based on the scheduling information B of the message B and the message type B. Because the terminal and a network side already know the scheduling information of the minimum SI, the terminal may correctly receive the message A, and learn of the scheduling information B from the message A. The terminal can receive the message B correctly by using the scheduling information B.

Optionally, the SI message may be any one of an SIB1 message, an SIB2 message, . . . , and an SIB23 message. Different SIB messages may correspond to different scheduling information.

In the foregoing method, the DU may find a corresponding channel based on a message type to send a corresponding message. For example, the message may be sent on a broadcast channel based on the first message type.

Optionally, interactions between the CU and the DU may be performed according to a transport layer protocol, namely, Stream Control Transmission Protocol (Stream Control Transmission Protocol, SCTP for short). When information is exchanged between the CU and the DU according to the SCTP, reliability can be improved. Specifically, the CU may use the first message as a payload of an SCTP data packet, add the indication information into a protocol header of the SCTP data packet, and send the first message and the indication information to the DU. For processing of the second message, refer to the manner.

Optionally, if the DU corresponds to a plurality of cells, the indication information may further include a cell identifier. After receiving the cell identifier, the DU may then send the message to a corresponding cell.

Optionally, if the DU supports various network standards, for example, if the DU can support 2G, 3G, and 4G, network standard indication information may also be included in the indication information. The network standard indication information is used to indicate which access technology is to be used to send a message. After receiving network standard information, the DU may use a corresponding network standard to send a message.

Optionally, for information exchanges between the CU and the DU, a GPRS Tunneling Protocol-User Plane (GPRS Tunneling Protocol-User Plane, GTP-U for short) or protocol encapsulation (Protocol Oblivious Encapsulation, PoE) manner may be used to send a message to the DU.

EXAMPLE 1

A GTP-U tunnel may be established for each message type between the CU and the DU. To be specific, a correspondence (mapping or association) relationship is established between a message type and a tunnel. A message sent to the DU through the tunnel may be considered having a message type corresponding to the tunnel. Specifically, after receiving a GTP-U data packet, the DU may learn of a corresponding message type based on an identifier (for example, an endpoint identifier, where the endpoint identifier may be an endpoint identifier on a CU side or an endpoint identifier on a DU side, and the endpoint identifier may identify the tunnel) of the tunnel carried in the GTP-U data packet. GTP-U is referred to as GTP for short below.

Optionally, during setup of a tunnel, the scheduling information, the cell identifier, or the network standard information corresponding to the message type may also be sent to the DU. After receiving, through the tunnel, the message sent by the CU, the DU finds the message type, the scheduling information, the cell identifier, the network standard indication information, or the like corresponding to the tunnel, to correctly send the message transferred through the tunnel.

In an optional implementation, when the CU and the DU establish a tunnel, the CU may send the message type to the DU, and can therefore establish an association relationship between a message type and a tunnel. (1) If the scheduling information is regulated in a communications standard, during setup of the tunnel, the scheduling information corresponding to the message type may be not sent to the DU. (2) If the scheduling information needs to be sent by the CU to the DU, during setup of the tunnel, the scheduling information corresponding to the message type is sent to the DU. (3) If the scheduling information needs to be sent by the CU to the DU, the scheduling information is sent to the DU when a message is sent to the DU subsequently. For example, when a payload of a GTP data packet sent by the CU to the DU carries a message to be sent, a packet header of the GTP data packet carries the scheduling information corresponding to the message type.

Optionally, in the foregoing case (1), (2) or (3), if the cell identifier or the network standard information is further needed, the cell identifier or the network standard information may be sent to the DU during setup of a tunnel. In this case, when a message is sent to the DU subsequently, the cell identifier or the network standard information no longer needs to be sent, and the DU may obtain needed information by using a tunnel endpoint identifier. Optionally, in the case (1), (2) or (3), if the cell identifier or the network standard information is further needed, the cell identifier or the network standard information may be sent to the DU when a message is sent to the DU. For example, the CU adds a to-be-sent message to a payload of a GTP data packet sent to the DU. The packet header of the GTP data packet carries the cell identifier or the network standard information.

Optionally, a payload type (payload type) may be used to carry different information in a GTP packet header. For example, the GTP packet header includes one or more payload type fields. Different values of one payload type field represent different message types. Different values of another payload type field represent different cell identifiers. Different values of still another payload type field represent different network standards.

Optionally, in the second optional design, a trigger condition may be set to trigger sending the first message. For example, in the second optional design, the method may further include: receiving, by the DU, a first request message from one or more terminals, where the first request message includes the first message type. After receiving the first request message, the DU may learn that the terminal requests the first message. For example, the terminal requests an SIB2 message, requests an SIB3 message, or requests an other-SI2 message.

It may be learned that a trigger condition for the DU to send the first message to the terminal is reception of a request from the terminal. The DU may send the first message to the terminal based on the request from the terminal. If the first message does not exist on the DU, or the first message has already been invalid, or the DU needs to obtain the first message from the CU each time, or a condition that is set on the DU is met, the DU may request to obtain the first message from the CU. For example, the DU sends a second request message to the CU, where the second request message includes the first message type. After receiving the second request message, the CU learns, based on a message type carried in the second request, that the first message needs to be sent to the DU.

Optionally, the second request may further carry scheduling information that is recommended by the DU and that corresponds to the first message, and the scheduling information is used for reference by the CU. If the CU agrees to use the scheduling information, when the first request message is sent to the DU, only the indication information needs to be sent to inform the DU that the CU agrees to use the recommended scheduling information, and the scheduling information does not need to be repeatedly sent to the DU.

Optionally, one threshold may be set on the DU. When a quantity of times that the terminal requests the first message meets a threshold, the DU may send the first message to the terminal or request the CU to send the first message to the DU, to enable the DU to send the first message.

The second optional design may be applied to an SI message in an LTE system or an other-SI message in an NR system.

Currently, cell-level messages discussed in the NR system include minimum system information (minimum System Information, minimum SI) and other system information (other SI) (which is also referred to as on-demand SI). Scheduling information of the minimum SI may be regulated in a communications standard, and scheduling information of the other SI may be notified by a network side to a terminal. For example, the scheduling information of the other SI is carried in the minimum SI.

For UE in a connected state, the UE requests other SI by sending an RRC message. A base station sends the other SI to the UE directly by using an RRC message, or a base station may send the other SI to the UE directly in a broadcast manner. In particular, for UE in an idle state or a third state, the UE may request other SI by using a random-access channel (Random-access Channel, RACH) msg1 or msg3, and the base station may send, to the UE directly by using a RACH msg2 or msg4, the other SI requested by the UE or may directly send the other SI to the UE in a broadcast manner.

When sending the minimum SI and the other SI to the DU, the CU may send the minimum SI and the other SI to the DU directly or may send a preset threshold to the DU. After a quantity of messages for requesting the other SI that are sent by the UE and that are received by the DU exceeds the preset threshold, the DU sends an indication message to the CU. The indication message not only includes a notification message used to instruct the CU to send the other SI (where for example, the notification message includes an SIB type of the other SI, and for example, the DU requests the CU to send an SIB2 and an SIB5), but also includes scheduling information that is of the other SI and that is recommended by the DU. For example, the notification message sent by the DU to the CU is "SIB2+period+SI window" and "SIB5+period+SI window". In addition, the DU may further send a notification message to the UE by using a msg2/msg4, to instruct the UE to listen to a broadcast to obtain the other SI. After the CU receives the indication message, because the scheduling information of the other SI needs to be notified to the UE, the CU sends updated minimum SI to the DU. Optionally, if the CU accepts the scheduling information that is of the other SI and that is recommended by the DU, the CU no longer sends the scheduling information of the other SI to the DU. If the CU does not accept the scheduling information that is of the other SI and that is recommended by the DU, the CU further needs to send, to the DU, an SIB type of the other SI and corresponding scheduling information that are determined by the CU. Optionally, when the CU sends the other SI to the DU for the first time or the other SI changes, the CU further needs to send, to the DU, the changed other SI.

When a quantity of request messages that are sent by the UE and that are received by the DU exceeds the preset threshold, the following cases may be included: A total quantity of request messages for requesting to broadcast an RRC message that are sent by the UE and that are received by the DU exceeds a first preset threshold, or a total quantity of request messages received within a preset time period exceeds a second preset threshold, or frequency of receiving request messages exceeds a third preset threshold.

It should be noted that the CU may send the updated minimum SI, the SIB type and the scheduling information of the other SI, and the other-SI message to the DU in the foregoing control plane manner or in the foregoing user plane manner. A specific sending manner is not limited herein in this embodiment.

In the message sending method provided in this embodiment, the scheduling information is indicated to the DU to enable the DU to correctly send a message that is sent by the CU to the DU. In addition, the correspondence between the scheduling information and the message type is established in advance, thereby reducing burden of interactions between the CU and the DU.

The user-level message is described below by using an example.

For example, the user-level message may be an SRB message. SRB messages may include a signaling radio bearer (signaling radio bearer, SRB for short) 0 (for example, an RRC connection setup request, an RRC connection setup message, or an RRC connection setup complete message), an SRB1 (for example, an RRC reconfiguration message or an RRC reconfiguration complete message), and an SRB2 (a security-related RRC message). A transparent mode (transparent mode, TM) is used for the SRB0 at present, and there is no corresponding PDCP/RLC entity. In an example, the PDCP/RLC entity is configured by using an RRC message of a base station after an RRC connection is established. Therefore, an SRB0 message before an RRC connection is established does not have a corresponding PDCP/RLC entity. The SRB1 and the SRB2 each have a corresponding PDCP and RLC entity. In an example, after an RRC connection is established, a base station configures a PDCP entity/an RLC entity corresponding to the SRB1 by using an RRC message. After a security authentication procedure, the base station further configures a PDCP entity/an RLC entity corresponding to the SRB2 by using an RRC message. Herein, the SRB0, the SRB1, and the SRB2 may be considered as different message types. Sometimes, the SRB0, the SRB1, and the SRB2 may be referred to as SRB identifier information. For the SRB1 or the SRB2, the DU may find the corresponding PDCP/RLC entity (where in current LTE protocols, the PDCP/RLC entity corresponds to each SRB/DRB of each UE) based on a message type of the SRB and terminal device identifier information. The SRB1 or the SRB2 is processed by the PDCP/RLC entity, is then sent into a MAC/PHY layer, and is eventually sent to a corresponding terminal. The SRB0 is directly sent into the MAC/PHY layer and eventually sent to a corresponding terminal without being processed by a PDCP entity/an RLC entity. In an example, the DU directly sends, based on the SRB identifier information, namely, the SRB0, the SRB0 to the MAC/PHY layer for processing, and the SRB0 is eventually sent, through an air interface, to a terminal corresponding to the terminal identifier information. In an example, the DU directly sends, based on the SRB identifier information, namely, the SRB0, the SRB0 to the MAC/PHY layer for processing. The SRB0 is eventually sent, through an air interface, to a terminal corresponding to the terminal identifier information.

The user-level message may be sent in the following manner in this application. In the first optional design, the CU-DU control plane protocol may be used to transfer a message. In an example, the CU-DU interface control plane protocol is used to transfer the user-level message.

In the design, a message sending method provided in an embodiment of this application includes:

sending, by a CU, a first message and indication information to a DU; and

Optionally, the indication information includes a first message type of the first message and a terminal identifier, and the first message type is an SRB0 message, an SRB1 message, an SRB2 message, an SI message, or an other-SI message. In this case, the first message type may be referred to as an SRB identifier or SRB identifier information.

sending, by the DU, the first message based on the first message type and the terminal identifier.

Optionally, if the first message type is an SRB0, the DU sends, based on a terminal identifier and the SRB0, the first message on a physical resource that is distributed to a terminal and that corresponds to the SRB0.

Optionally, if the first message type is an SRB1 or an SRB2, after finding a PDCP/RLC entity corresponding to the terminal identifier and an SRB type and sending the first message into the corresponding PDCP/RLC entity for corresponding processing, the DU may send the first message on a physical resource that is distributed to the terminal and that corresponds to the SRB1 or the SRB2.

Optionally, if the first message type is an SI message or an other-SI message, the DU may process the SI message or the other-SI message as an SRB0 message, an SRB1 message, or an SRB2 message.

In an implementation, the SCTP protocol may be used for interactions between the CU and the DU. The CU may add the first message to a payload of an SCTP data packet. A packet header of the SCTP data packet carries the indication information and a terminal identifier, to send the first message, the indication information, and the terminal identifier to the DU.

Optionally, the indication information may further include a cell identifier or a network standard. For example, the sending, by the DU, the first message based on the indication information may be: sending, by the DU based on the first message type and the terminal identifier, the first message in a cell corresponding to the cell identifier, or the sending, by the DU, the first message based on the indication information may be: sending, by the DU, the first message based on the first message type and the terminal identifier and by using a wireless technology corresponding to the network standard.

In a second optional design, a user plane tunnel between the CU and the DU may be used to transfer a message. For related content, refer to the foregoing related content in which GTP-U is used to transfer a cell-level message.

In a first optional implementation, one user plane tunnel, for example, a GTP-U tunnel, may be established for each SRB of each terminal between the CU and the DU.

EXAMPLE 1

The DU sends a tunnel setup request to the CU, where the setup request includes the first message type of the first message and a terminal identifier.

EXAMPLE 2

The CU sends a tunnel setup request to the DU, where the setup request includes the first message type of the first message and a terminal identifier.

By using the foregoing two examples, an association relationship may be established between a tunnel and each of the first message type and the terminal identifier. In other words, an association relationship may be established between a tunnel endpoint identifier and each of the first message type and the terminal identifier. The DU may learn of the corresponding message type and terminal identifier from the message received through the tunnel. The tunnel endpoint identifier may be a tunnel endpoint identifier on a CU side or may be a tunnel endpoint identifier on a DU side.

In the implementation, a message sending method provided in an embodiment of this application includes:

sending, by a CU, indication information and a first message to a DU, where the indication information is a tunnel endpoint identifier; and sending, by the DU, the first message based on a first message type and a terminal identifier that are corresponding to the tunnel.

Optionally, a payload part of a GTP data packet sent by the CU to the DU may carry the first message, and a packet header of the GTP data packet may carry the indication information, for example, the tunnel endpoint identifier.

Optionally, the indication information can further include a cell identifier or network standard information, so that the DU sends the first message in a corresponding cell or sends the first message by using a corresponding network technology.

In the foregoing solution, a tunnel is established for each SRB of each terminal, and the CU does not need to send a message type and a terminal identifier of a message to the DU each time, so that resources for interactions between the CU and the DU are saved.

In a second optional implementation, one user plane tunnel may be established for each terminal between the CU and the DU.

EXAMPLE 1

The DU sends a tunnel setup request to the CU, where the setup request includes a terminal identifier.

EXAMPLE 2

The CU sends a tunnel setup request to the DU, where the setup request includes a terminal identifier.

By using the foregoing two examples, an association relationship between a tunnel and a terminal identifier may be established. In other words, an association relationship between a tunnel endpoint identifier and a terminal identifier may be established. The DU may learn of a corresponding terminal identifier from a message received from the tunnel. The tunnel endpoint identifier may be a tunnel endpoint identifier on a CU side or may be a tunnel endpoint identifier on a DU side.

In the implementation, a message sending method provided in an embodiment of this application includes:

sending, by a CU, indication information and a first message to a DU, where the indication information includes a tunnel endpoint identifier and a first message type of the first message; and sending, by the DU, the first message based on a terminal identifier and the first message type that are corresponding to the tunnel.

Optionally, a payload part of a GTP data packet sent by the CU to the DU may carry the first message, and a packet header of the GTP data packet may carry the indication information, for example, a tunnel endpoint identifier and the first message type of the first message.

Optionally, the indication information can further include a cell identifier or network standard information, so that the DU sends the first message in a corresponding cell or sends the first message by using a corresponding network technology.

In the foregoing solution, a tunnel is established for each SRB of each terminal, and the CU does not need to send a terminal identifier corresponding to the message to the DU each time, so that resources for interactions between the CU and the DU are saved.

In an example, a payload type (payload type) may be used to carry different information in a GTP packet header. For example, the GTP packet header includes one or more payload type fields. Different values of one payload type field represent different message types, different values of another payload type field represent different cell identifiers, and different values of still another payload type field represent different network standards.

A person skilled in the art should know that the user plane tunnel is bidirectional. Therefore, not only the CU needs to provide a tunnel endpoint on a CU side to inform the DU of a tunnel endpoint to which each DRB or SRB message is sent, but also the DU needs to provide a tunnel endpoint on a DU side to inform the CU of a tunnel endpoint to which each SRB or DRB message is sent. Therefore, the CU and the DU exchange messages to learn of a mapping relationship between indication information and a tunnel endpoint.

In the message sending method provided in this embodiment, after receiving a message type of the SRB and terminal device identifier information that are sent by the CU, the DU may send a message to a terminal device corresponding to the terminal device identifier information based on the message type of the SRB and the terminal device identifier information.

Figure 3:
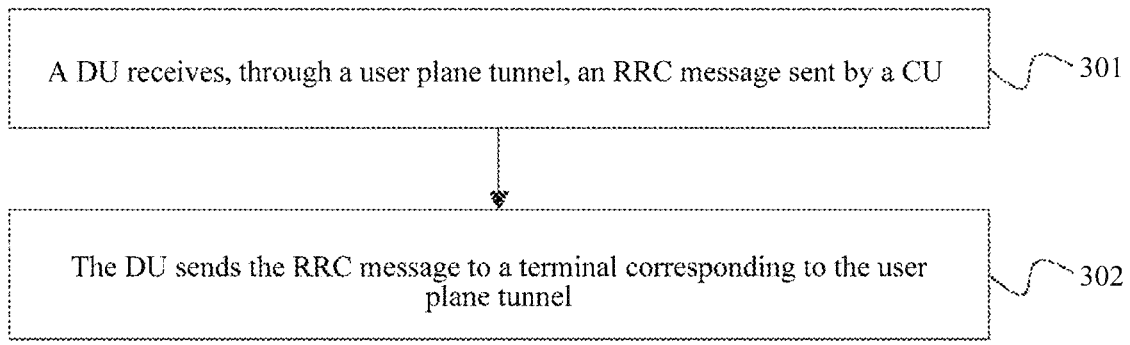
FIG. 3 is a schematic flowchart of Embodiment 2 of a Radio Resource Control RRC message sending method according to this application.

FIG. 3 is a schematic flowchart of Embodiment 2 of a Radio Resource Control RRC message sending method according to this application. This embodiment of this application provides the Radio Resource Control RRC message sending method. The method may be performed by any apparatus that performs the Radio Resource Control RRC message sending method. The apparatus may be implemented by using software and/or hardware. In this embodiment, the apparatus may be integrated into a DU. As shown in FIG. 3, the method in this embodiment may include the following steps.

Step 301: A DU receives, through a user plane tunnel, an RRC message sent by a CU.

Step 302: The DU sends the RRC message to a terminal corresponding to the user plane tunnel.

In this application, the SCTP control plane protocol is used in UE-level signaling transmission. The CU needs to specify SRB identifier information and terminal device identifier information for the DU. In another optional implementation in this embodiment, signaling may be transmitted according to a transport layer protocol in a user plane, namely, User Data Protocol (User Data Protocol, UDP for short) and GPRS Tunneling Protocol-User Plane (GPRS Tunneling Protocol-User Plane, GTP-U for short). The CU may send the RRC message to the DU through a GTP-U tunnel. The GTP-U carries a tunnel endpoint identifier (Tunnel Endpoint ID, TEID for short). Therefore, the CU does not need to additionally indicate the SRB identifier information and the terminal device identifier information to the DU. In this way, the DU can correctly forward the RRC message to UE based on the TEID.

In the Radio Resource Control RRC message sending method provided in this embodiment of this application, the DU receives, through the user plane tunnel, the RRC message sent by the CU, and sends the RRC message. Because GTP-U carries a TEID, the DU may send the RRC message based on the TEID. In this way, the DU may correctly forward signaling.

Optionally, before the receiving, by a DU, an RRC message sent by a CU, the method further includes: receiving, by the DU, a bearer setup request message sent by the CU, and establishing, by the DU, the user plane tunnel between the DU and the CU based on the bearer setup request message.

Specifically, before the CU sends the RRC message to the DU, the user plane tunnel between the CU and the DU needs to be established first. During specific implementation, different user plane tunnels may be established based on different SRB types. After the user plane tunnel is established, the CU sends the RRC message to the DU through the user plane tunnel.

Figure 4:
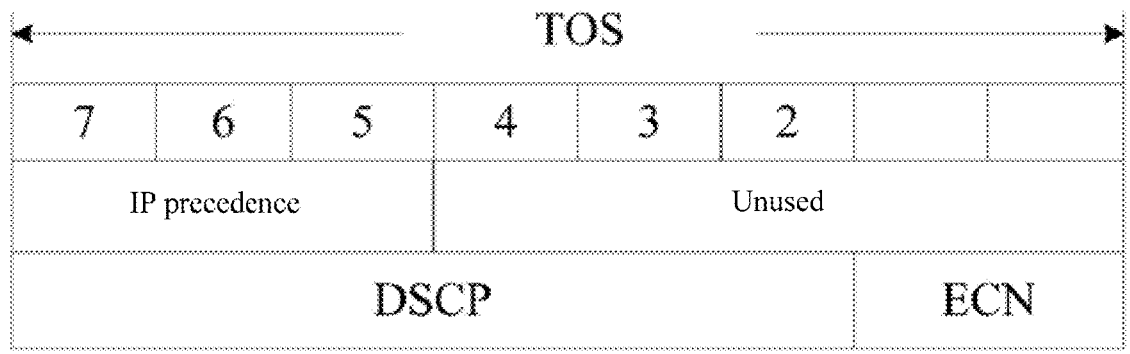
FIG. 4 is a schematic diagram of bits of DSCP precedence and IP precedence.

In addition, during setup of the user plane tunnel, the RRC message is distinguished from data. During specific implementation, because the bearer setup request message sent by the CU to the DU includes a TEID, the DU can distinguish an SRB type of the RRC message from data by using the TEID. The SRB type may be, for example, an SRB1 and an SRB2. After the SRB type is distinguished from the data, different manners are used to ensure a priority of signaling. A person skilled in the art may understand that a priority of data is ensured by using a quality of service (Quality of Service, QoS for short) parameter. In this embodiment, a priority of the RRC message may be defined in the following manner: reusing a transmission priority defined in a differentiated services code point (Differentiated Services Code Point, DSCP for short) or redefining a priority of an unused field in the DSCP. FIG. 4 is a schematic diagram of bits of DSCP precedence and IP precedence. As shown in FIG. 4, first six bits of a type of service (Type Of Service, TOS for short) are defined as a DSCP, and last two bits are reserved. In this way, the DSCP may define 64 levels. At present, only twenty or so levels are used. An undefined field may be used to define a transmission priority of the RRC message.

A DSCP value has two representation manners: a digital form and a keyword form. When the digital form is used, six bits are used for a DSCP, and a decimal interval is 0 to 63. Therefore, 64 levels (priorities) may be defined. For example, a binary DSCP value 000000 is equal to a decimal DSCP value 0, and a binary DSCP value 010010 is equal to a decimal DSCP value 18. In addition, a DSCP value in a keyword form is referred to as per-hop behavior (Per-Hop Behavior, PHB for short). Three types of PHB are defined at present: best effort service (Best Effort Service, BE Service for short), assured forwarding (Assured Forwarding, AF for short), and expedited forwarding (Expedited forwarding, EF for short). Coexistence of DSCP precedence and IP precedence causes a compatibility problem. In addition, a DSCP has relatively poor readability. Therefore, DSCPs are further classified. There are a total of four classes of DSCPs: class selector (Class Selector, CS for short) aaa 000, EF 101 110, AF aaa bb0, and default 000 000. In addition, CS6 and CS7 are used for protocol packets by default, a failure in receiving these packets causes a protocol interruption, and these packets are packets having highest priorities in a hardware queue of most vendors. EF is used to carry voice traffic, because voice requires low latency, low jitter, a low packet loss rate, and voice packets are second in importance only to protocol packets. AF4 is used to carry signaling traffic of voice. AF3 may be used to carry live traffic of Internet Protocol Television (Internet Protocol Television, IPTV for short). High real-time performance of live broadcast requires continuity and an ensured high throughput. AF2 may be used to carry traffic of Video on Demand (Video on Demand, VOD for short). VOD does not require real-time performance as high as that required by live broadcast and allows a latency or buffering. AF1 may carry less important leased line services. Unlike leased line services, IPTV and voice services are key services of operators and need to be given the top priorities.

A person of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Figure 5:
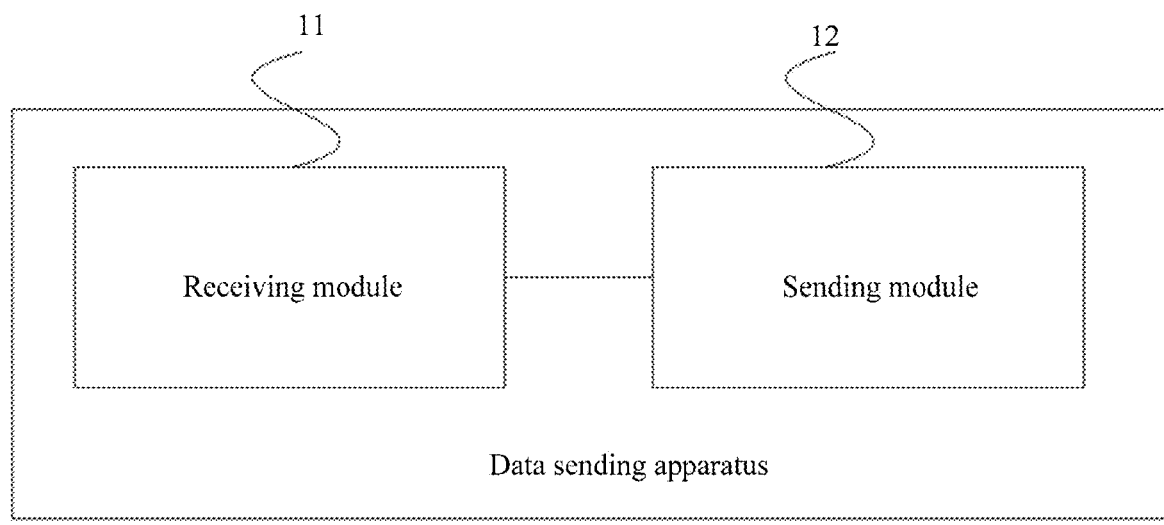
FIG. 5 is a schematic structural diagram of Embodiment 1 of a Radio Resource Control RRC message sending apparatus according to the embodiments of this application.

FIG. 5 is a schematic structural diagram of Embodiment 1 of a Radio Resource Control RRC message sending apparatus according to the embodiments of this application. The sending apparatus may be an independent DU or may be an apparatus integrated in a DU. The apparatus may be implemented by using software, hardware or a combination of software and hardware. As shown in FIG. 5, the sending apparatus includes:

a receiving module 11, configured to receive a Radio Resource Control RRC message and indication information that are sent by a central node CU; and a sending module 12, configured to send the RRC message based on the indication information.

Optionally, correspondingly, the receiving module 11 may be a receiver in a receive end device, and the sending module 12 may be a transmitter in the receive end device.

The Radio Resource Control RRC message sending apparatus provided in this embodiment of this application receives the RRC message and the indication information that are sent by the CU, and sends the RRC message based on the indication information. After receiving the RRC message and the indication information, the Radio Resource Control RRC message sending apparatus may send the RRC message based on the indication information, so that the apparatus can correctly forward signaling.

Optionally, the indication information includes a message type and a cell identifier, and the message type is used to indicate a message type of the RRC message; and the sending module 12 is further configured to broadcast, based on the cell identifier and the message type, the RRC message in a cell corresponding to the cell identifier.

Optionally, the indication information further includes network standard indication information, and the network standard indication information is used to indicate a standard type of a radio access network over which the RRC message is sent.

Optionally, the indication information includes signaling radio bearer SRB identifier information and terminal device identifier information; and the sending module 12 is further configured to send, based on the SRB identifier information and the terminal device identifier information, the RRC message to a terminal device corresponding to the terminal device identifier information.

The Radio Resource Control RRC message sending apparatus provided in this embodiment of this application may perform the foregoing method embodiments. Their implementation principles and technical effects are similar. Details are not described herein again.

Figure 6:
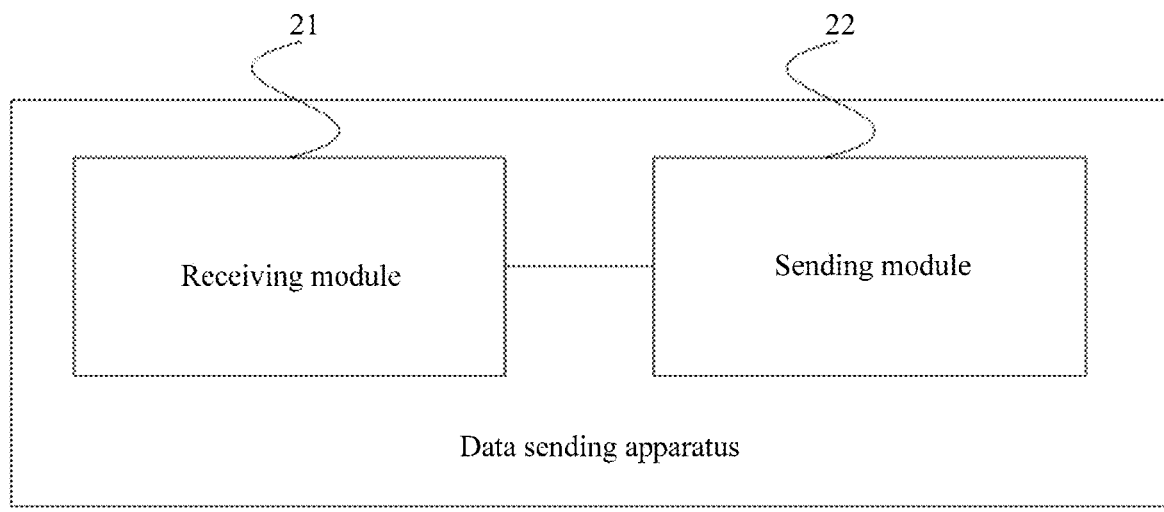
FIG. 6 is a schematic structural diagram of Embodiment 2 of a Radio Resource Control RRC message sending apparatus according to the embodiments of this application.

FIG. 6 is a schematic structural diagram of Embodiment 2 of a Radio Resource Control RRC message sending apparatus according to the embodiments of this application. The sending apparatus may be an independent DU or may be an apparatus integrated in a DU. The apparatus may be implemented by using software, hardware or a combination of software and hardware. As shown in FIG. 6, the Radio Resource Control RRC message sending apparatus includes:

a receiving module 21, configured to receive, through a user plane tunnel, a Radio Resource Control RRC message sent by a central node CU; and a sending module 22, configured to send the RRC message to a terminal corresponding to the user plane tunnel.

In the Radio Resource Control RRC message sending apparatus provided in this embodiment of this application, the DU receives, through the user plane tunnel, the RRC message sent by the CU, and sends the RRC message. Because GTP-U carries a TEID, the DU may send the RRC message based on the TEID. In this way, the DU may correctly forward signaling.

Figure 7:
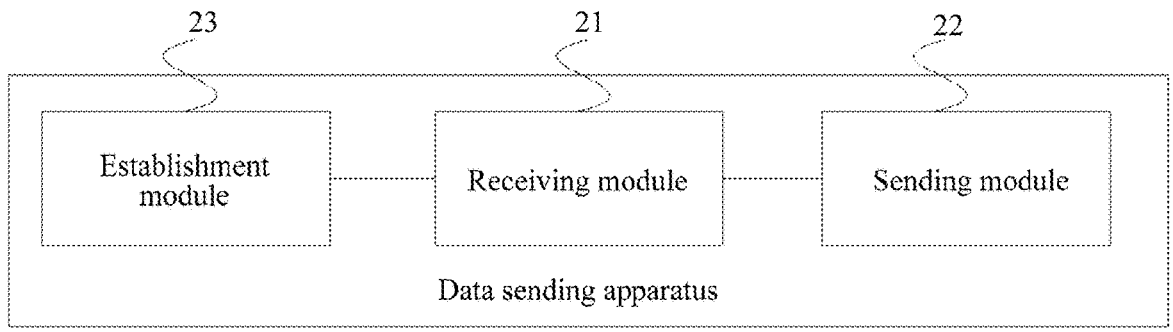
FIG. 7 is a schematic structural diagram of Embodiment 3 of a Radio Resource Control RRC message sending apparatus according to the embodiments of this application.

FIG. 7 is a schematic structural diagram of Embodiment 3 of a Radio Resource Control RRC message sending apparatus according to the embodiments of this application. Based on the foregoing embodiments, as shown in FIG. 7, the apparatus further includes an establishment module 23, where the receiving module 21 is further configured to receive a bearer setup request message sent by the CU; and the establishment module 23 is configured to establish a user plane tunnel between the DU and the CU based on the bearer setup request message.

The Radio Resource Control RRC message sending apparatus provided in this embodiment of this application may perform the foregoing method embodiments. Their implementation principles and technical effects are similar. Details are not described herein again.

Figure 8:
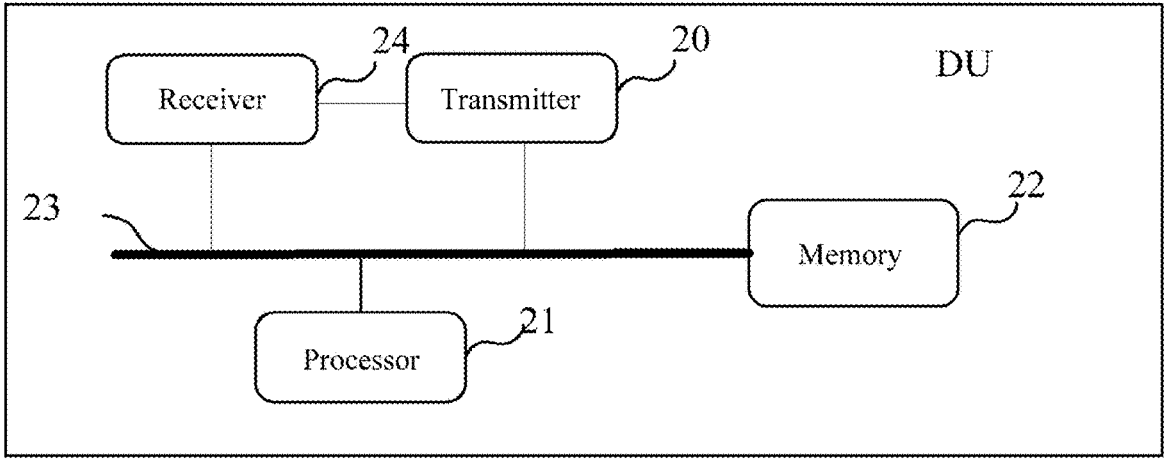
FIG. 8 is a schematic structural diagram of Embodiment 1 of a DU according to the embodiments of this application.

FIG. 8 is a schematic structural diagram of Embodiment 1 of a DU according to the embodiments of this application. As shown in FIG. 8, the DU may include a transmitter 20, a processor 21, a memory 22, and at least one communications bus 23. The communications bus 23 is configured to implement communication and a connection between components. The memory 22 may include a high-speed RAM memory 22 or may further include a non-volatile memory NVM, for example, at least one magnetic disk memory 22. The memory 22 may store various programs, to implement various processing functions and implement method steps of this embodiment. In addition, the DU may further include a receiver 24. The receiver 24 in this embodiment may be a corresponding input interface having a communications function and an information receiving function or may be a radio frequency module or a baseband module on the DU. The transmitter 20 in this embodiment may be a corresponding output interface having a communications function and an information sending function or may be a radio frequency module or a baseband module on the DU. Optionally, the transmitter 20 and the receiver 24 may be integrated in one communications interface or may be two independent communications interfaces.

In this embodiment, the receiver 24 is configured to receive a Radio Resource Control RRC message and indication information that are sent by a central node CU; and the transmitter 20 is configured to send the RRC message based on the indication information.

Optionally, the indication information includes a message type and a cell identifier, and the message type is used to indicate a message type of the RRC message; and the transmitter 20 is further configured to broadcast, based on the cell identifier and the message type, the RRC message in a cell corresponding to the cell identifier.

Optionally, the indication information further includes network standard indication information, and the network standard indication information is used to indicate a standard type of a radio access network over which the RRC message is sent.

Optionally, the indication information includes signaling radio bearer SRB identifier information and terminal device identifier information; and the transmitter 20 is further configured to send, based on the SRB identifier information and the terminal device identifier information, the RRC message to a terminal device corresponding to the terminal device identifier information.

The DU provided in this embodiment of this application may perform the foregoing method embodiments. Their implementation principles and technical effects are same. Details are not described herein again.

Figure 9:
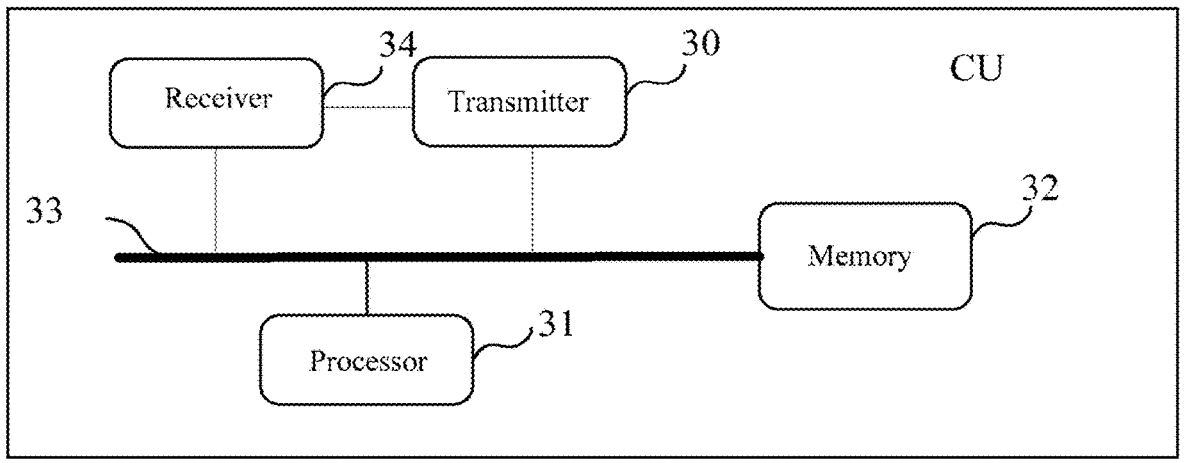
FIG. 9 is a schematic structural diagram of Embodiment 2 of a DU according to the embodiments of this application.

FIG. 9 is a schematic structural diagram of Embodiment 2 of a DU according to the embodiments of this application. As shown in FIG. 9, the DU may include a transmitter 30, a processor 31, a memory 32, and at least one communications bus 33. The communications bus 33 is configured to implement communication and a connection between components. The memory 32 may include a high-speed RAM memory 32 or may further include a non-volatile memory NVM, for example, at least one magnetic disk memory 32. The memory 32 may store various programs, to implement various processing functions and implement method steps of this embodiment. In addition, the DU may further include a receiver 34. The receiver 34 in this embodiment may be a corresponding input interface having a communications function and an information receiving function or may be a radio frequency module or a baseband module on the DU. The transmitter 30 in this embodiment may be a corresponding output interface having a communications function and an information sending function or may be a radio frequency module or a baseband module on the DU. Optionally, the transmitter 30 and the receiver 34 may be integrated in one communications interface or may be two independent communications interfaces.

In this embodiment, the receiver 34 is configured to receive, through a user plane tunnel, a Radio Resource Control RRC message sent by a central node CU; and the transmitter 30 is configured to send the RRC message to a terminal corresponding to the user plane tunnel.

Optionally, the receiver 34 is further configured to receive a bearer setup request message sent by the CU; and the processor 31 is configured to establish the user plane tunnel between the DU and the CU based on the bearer setup request message.

The DU provided in this embodiment of this application may perform the foregoing method embodiments. Their implementation principles and technical effects are similar. Details are not described herein again.

An embodiment of this application further provides a node. The node is configured to implement, for example, the foregoing message sending method. Optionally, the node may be a DU.

In an optional design, the node includes a processor, a transceiver, and a communications circuit. The processor is configured to: receive a first message and indication information from a central node CU by using the communications circuit, and send the first message based on the indication information.

In another optional design, the node includes a processor and a memory. The memory is configured to store a program for implementing, for example, the foregoing message sending method. The processor is configured to execute the foregoing program to implement a method such as the foregoing message sending method.

For how the node sends a message, refer to the content of, for example, the foregoing message sending method.

According to a fourth aspect, an embodiment of this application further provides another node. The node is configured to implement, for example, the foregoing message sending method. Optionally, the node may be a CU.

In an optional design, the node includes a processor and a communications circuit. The processor is configured to obtain indication information associated with a first message. The indication information is used to send the first message. The processor sends the first message and the indication information to a distributed node DU by using the communications circuit.

In another optional design, the node includes a processor and a memory. The memory is configured to store a program for implementing the foregoing message sending method. The processor is configured to execute the foregoing program to implement the foregoing message sending method.

For how the node sends a message, refer to the content of the foregoing message sending method.

An embodiment of this application further provides a communications system, including the foregoing two nodes.

An embodiment of this application further provides a computer program product. The program product includes a program used to implement the foregoing message sending method.

An embodiment of this application further provides a computer readable storage medium. The medium stores the foregoing program.

This application further provides the following embodiments. It should be noted that sequence numbers of the following embodiments are not necessarily strictly executed:

Embodiment 1: A message sending method, including:
receiving, by a distributed node DU, a first message and indication information from a central node CU; and
sending, by the DU, the first message based on the indication information.

Embodiment 2: The method according to Embodiment 1, where
the indication information includes a first message type of the first message, the first message type is a master information block MIB message, a system information block type 1 SIB1 message, a paging paging message, a minimum system information minimum SI message, a system information SI message, or an other-system-information other-SI message, and the first message type is associated with first scheduling information; and
the sending, by the DU, the first message based on the indication information is:
sending, by the DU, the first message based on the first message type and the first scheduling information.

Embodiment 3: The method according to Embodiment 1, where
the indication information includes first scheduling information of the first message and a first message type of the first message, and the first message type is a system information SI message or an other-system-information other-SI message;
the sending, by the DU, the first message based on the indication information is:
sending, by the DU, the first message based on the first message type and the first scheduling information; and
the method further includes:
receiving, by the DU, a second message and a second message type of the second message from the CU, where the second message type is a system information block type 1 SIB1 message or a minimum system information minimum SI message, and the second message includes the first scheduling information; and
sending, by the DU, the second message based on the second message type and second scheduling information associated with the second message type.

Embodiment 4: The method according to Embodiment 3, further including:
receiving, by the DU, a first request message from one or more terminals, where the first request message includes the first message type; and
sending, by the DU, a second request message to the CU, where the second request message includes the first message type.

Embodiment 5: The method according to Embodiment 4, where
a quantity of the first request messages meets a threshold condition.

Embodiment 6: The method according to Embodiment 5, further including:
receiving, by the DU, the threshold condition from the CU.

Embodiment 7: The method according to any one of Embodiments 2 to 6, where
the indication information further includes a cell identifier or a network standard; and
the sending, by the DU, the first message based on the first message type and the first scheduling information is:
sending, by the DU based on the first message type and the first scheduling information, the first message in a cell corresponding to the cell identifier; or
sending, by the DU, the first message based on the first message type and the first scheduling information and by using a wireless technology corresponding to the network standard.

Embodiment 8: The method according to any one of Embodiments 2 to 7, where the first scheduling information includes validity information, a scheduling period, or a scheduling window.

Embodiment 9: The method according to Embodiment 1, where
the indication information includes a first message type of the first message and a terminal identifier, and the first message type is a signaling radio bearer 1 SRB1 message, a signaling radio bearer 2 SRB2 message, a system information SI message, or an other-system-information other-SI message; and
the sending, by the DU, the first message based on the indication information is:
sending, by the DU, the first message based on the first message type and the terminal identifier.

Embodiment 10: The method according to Embodiment 1, where
the method further includes: sending, by the DU, a setup request message of a tunnel to the CU, where the setup request message includes a first message type of the first message and a terminal identifier;
the indication information includes an identifier of the tunnel; and
the sending, by the DU, the first message based on the indication information is:

sending, by the DU, the first message based on the first message type and the terminal identifier.

Embodiment 11: The method according to Embodiment 1, where the method further includes: sending, by the DU, a setup request message of a tunnel to the CU, where the setup request message includes a terminal identifier;

the indication information includes an identifier of the tunnel and a first message type of the first message; and the sending, by the DU, the first message based on the indication information is:

sending, by the DU, the first message based on the first message type and the terminal identifier.

Embodiment 12: The method according to any one of Embodiments 9 to 11, where the indication information further includes a cell identifier or a network standard; and the sending, by the DU, the first message based on the first message type and the terminal identifier is:

sending, by the DU based on the first message type and the terminal identifier, the first message in a cell corresponding to the cell identifier; or sending, by the DU, the first message based on the first message type and the terminal identifier and by using a wireless technology corresponding to the network standard.

Embodiment 13: A message sending method, including:

obtaining, by a central node CU, indication information associated with a first message, where the indication information is used to send the first message; and sending, by the CU, the first message and the indication information to a distributed node DU.

Embodiment 14: The method according to Embodiment 13, where the indication information includes a first message type of the first message, the first message type is a master information block MIB message, a system information block type 1 SIB1 message, a paging paging message, a minimum system information minimum SI message, a system information SI message, or an other-system-information other-SI message, and the first message type is associated with first scheduling information of the first message.

Embodiment 15: The method according to Embodiment 14, further including:

sending, by the CU, the first scheduling information to the DU.

Embodiment 16: The method according to Embodiment 14 or 15, where the indication information includes the first scheduling information of the first message and the first message type of the first message, and the first message type is a system information SI message or an other-system-information other-SI message; and the method further includes:

sending, by the CU, a second message and a second message type of the second message to the DU, where the second message type is a system information block type 1 SIB1 message or a minimum system information minimum SI message, and the second message includes the first scheduling information.

Embodiment 17: The method according to Embodiment 16, further including:

receiving, by the CU, a second request message from the DU, where the second request message includes the first message type.

Embodiment 18: The method according to Embodiment 17, further including:

sending, by the CU, a threshold condition associated with the second request message to the DU.

Embodiment 19: The method according to any one of Embodiments 14 to 18, where the first scheduling information includes validity information, scheduling information, or a scheduling window.

Embodiment 20: The method according to Embodiment 13, where the indication information includes a first message type of the first message and a terminal identifier, and the first message type is a signaling radio bearer 1 SRB1 message, a signaling radio bearer 2 SRB2 message, a system information SI message, or an other-system-information other-SI message.

Embodiment 21: The method according to Embodiment 13, where the method further includes:

receiving, by the CU, a setup request message of a tunnel from the DU, where the setup request message includes a first message type of the first message and a terminal identifier; and the indication information includes an identifier of the tunnel.

Embodiment 22: The method according to Embodiment 13, where the method further includes:

receiving, by the CU, a setup request message of a tunnel from the DU, where the setup request message includes a terminal identifier; and the indication information includes an identifier of the tunnel and a first message type of the first message.

Embodiment 23: The method according to any one of Embodiments 20 to 22, where the indication information further includes a cell identifier or a network standard.

Embodiment 24: A node, including a processor, a communications circuit, and a transceiver, where the processor is configured to: receive a first message and indication information from a central node CU by using the communications circuit, and send the first message based on the indication information.

Embodiment 25: The node according to Embodiment 24, where the indication information includes a first message type of the first message, the first message type is a master information block MIB message, a system information block type 1 SIB1 message, a paging paging message, a minimum system information minimum SI message, a system information SI message, or an other-system-information other-SI message, and the first message type is associated with first scheduling information; and the processor is configured to send, by using the transceiver, the first message based on the first message type and the first scheduling information.

Embodiment 26: The node according to Embodiment 24, where the indication information includes first scheduling information of the first message and a first message type of the first message, and the first message type is a system information SI message or an other-system-information other-SI message; and the processor is configured to send, by using the transceiver, the first message based on the first message type and the first scheduling information; and the processor is further configured to receive a second message and a second message type of the second message from the CU by using the communications circuit, where the second message type is a system information block type 1 SIB1 message or a minimum system information minimum SI message, and the second message includes the first scheduling information; and the processor is further configured to send, by using the transceiver, the second message based on the second message type and second scheduling information associated with the second message type.

Embodiment 27: The node according to Embodiment 26, where the processor is further configured to receive a first request message from one or more terminals by using the transceiver, where the first request message includes the first message type; and the processor is further configured to send a second request message to the CU by using the communications circuit, where the second request message includes the first message type.

Embodiment 28: The node according to Embodiment 27, where a quantity of the first request messages meets a threshold condition.

Embodiment 29: The node according to Embodiment 28, where the processor is further configured to receive the threshold condition from the CU by using the communications circuit.

Embodiment 30: The node according to any one of Embodiments 25 to 29, where the indication information further includes a cell identifier or a network standard; and the processor is configured to send, by using the transceiver and based on the first message type and the first scheduling information, the first message in a cell corresponding to the cell identifier, or send, by using the transceiver, the first message based on the first message type and the first scheduling information and by using a wireless technology corresponding to the network standard.

Embodiment 31: The node according to any one of Embodiments 25 to 30, where the first scheduling information includes validity information, a scheduling period, or a scheduling window.

Embodiment 32: The node according to Embodiment 24, where the indication information includes a first message type of the first message and a terminal identifier, and the first message type is a signaling radio bearer 1 SRB1 message, a signaling radio bearer 2 SRB2 message, a system information SI message, or an other-system-information other-SI message; and the processor is configured to send, by using the transceiver, the first message based on the first message type and the terminal identifier.

Embodiment 33: The node according to Embodiment 24, where the processor is further configured to send a setup request message of a tunnel to the CU by using the communications circuit, where the setup request message includes a first message type of the first message and a terminal identifier;

the indication information includes an identifier of the tunnel; and the processor is configured to send, by using the transceiver, the first message based on the first message type and the terminal identifier.

Embodiment 34: The node according to Embodiment 24, where the processor is further configured to send a setup request message of a tunnel to the CU by using the communications circuit, where the setup request message includes a first message type of the first message and a terminal identifier;

the indication information includes an identifier of the tunnel; and the processor is configured to send, by using the transceiver, the first message based on the first message type and the terminal identifier.

Embodiment 35: The node according to any one of Embodiments 32 to 34, where the indication information further includes a cell identifier or a network standard; and the processor is configured to: send, by using the transceiver and based on the first message type and the terminal identifier, the first message in a cell corresponding to the cell identifier, or send, by using the transceiver, the first message based on the first message type and the terminal identifier and by using a wireless technology corresponding to the network standard.

Embodiment 36: A node, including: a processor and a communications circuit, where the processor is configured to obtain indication information associated with a first message, where the indication information is used to send the first message; and the processor sends the first message and the indication information to a distributed node DU by using the communications circuit.

Embodiment 37: The node according to Embodiment 36, where the indication information includes a first message type of the first message, the first message type is a master information block MIB message, a system information block type 1 SIB1 message, a paging paging message, a minimum system information minimum SI message, a system information SI message, or an other-system-information other-SI message, and the first message type is associated with first scheduling information of the first message.

Embodiment 38: The node according to Embodiment 37, where the processor is further configured to send the first scheduling information to the DU by using the communications circuit.

Embodiment 39: The node according to Embodiment 36 or 37, where the indication information includes the first scheduling information of the first message and the first message type of the first message, and the first message type is a system information SI message or an other-system-information other-SI message; and the processor is further configured to send a second message and a second message type of the second message to the DU by using the communications circuit, where the second message type is a system information block type 1 SIB1 message or a minimum system information minimum SI message, and the second message includes the first scheduling information.

Embodiment 40: The node according to Embodiment 39, where the processor is further configured to receive a second request message from the DU by using the communications circuit, where the second request message includes the first message type.

Embodiment 41: The node according to Embodiment 40, where the processor is further configured to send, by using the communications circuit, a threshold condition associated with the second request message to the DU.

Embodiment 42: The node according to any one of Embodiments 37 to 41, where the first scheduling information includes validity information, scheduling information, or a scheduling window.

Embodiment 43: The node according to Embodiment 36, where the indication information includes a first message type of the first message and a terminal identifier, and the first message type is a signaling radio bearer 1 SRB1 message, a signaling radio bearer 2 SRB2 message, a system information SI message, or an other-system-information other-SI message.

Embodiment 44: The node according to Embodiment 36, where the processor is further configured to receive a setup request message of a tunnel from the DU by using the communications circuit, where the setup request message includes a first message type of the first message and a terminal identifier; and the indication information includes an identifier of the tunnel.

Embodiment 45: The node according to Embodiment 36, where the processor is further configured to receive a setup request message of a tunnel from the DU by using the communications circuit, where the setup request message includes a terminal identifier; and the indication information includes an identifier of the tunnel and a first message type of the first message.

Embodiment 46: The node according to any one of Embodiments 43 to 45, where the indication information further includes a cell identifier or a network standard.

In the several embodiments provided in this application, it should be understood that the disclosed apparatus and method may be implemented in other manners. For example, the described apparatus embodiments are merely examples. For example, the unit division is merely logical function division and may be other division in actual implementation. For example, a plurality of units or components may be combined or integrated into other system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor to perform some of the steps of the methods described in the embodiments of this application. The foregoing storage medium includes: any medium that can store program code, such as a USB flash drive, a removable hard disk, a read-only memory (Read-Only Memory, ROM), a random-access memory (Random-access Memory, RAM), a magnetic disk, or an optical disc.

It may be clearly understood by a person skilled in the art that, for the purpose of convenient and brief description, division of the foregoing function modules is used as an example for illustration. In actual application, the foregoing functions can be allocated to different function modules and implemented according to a requirement, in other words, an inner structure of an apparatus is divided into different function modules to implement all or part of the functions described above. For a detailed working process of the foregoing apparatus, reference may be made to a corresponding process in the foregoing method embodiments, and details are not described herein again.

It should be understood by a person of ordinary skill in the art that the first, the second, and various numbers in this specification are used for differentiation only for ease of description, instead of limiting the scope of the embodiments of this application.

A person of ordinary skill in the art may understand that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

What is claimed is:

1. A message sending method, comprising:
   receiving, by a distributed node (DU), a Radio Resource Control (RRC) message and indication information from a central node (CU), wherein the indication information is external to the RRC message, and wherein the indication information comprises a signaling radio bearer (SRB) identifier that indicates an SRB type of the RRC message and a terminal identifier that indicates a terminal for the RRC message, wherein the RRC message and the indication information are carried in a Stream Control Transmission Protocol (SCTP) layer message over an interface of the CU and DU, and wherein the CU comprises a Radio Resource Control (RRC) layer and a Packet Data Convergence Protocol (PDCP) layer, and the DU comprises a Radio Link Control (RLC) layer, a Media Access Control layer and physical layer; and sending, by the DU, the RRC message based on the SRB identifier and the terminal identifier.

2. The method according to claim 1, wherein the SRB identifier is an SRB0, an SRB1, an SRB2, or an SRB3, and wherein the RRC message is a user-level RRC message rather than a cell-level RRC message.

3. The method according to claim 1, wherein the receiving, by the DU, a RRC message and indication information from the CU comprises:
receiving, by the DU, the RRC message and the indication information from the CU according to a CU-DU control plane protocol.

4. A message sending method, comprising:
obtaining, by a central node (CU), indication information associated with a Radio Resource Control (RRC) message, wherein the indication information is used to send the RRC message, and the indication information comprises a signaling radio bearer (SRB) identifier that indicates an SRB type of the RRC message and a terminal identifier that indicates a terminal for the RRC message, wherein the RRC message and the indication information are carried in a Stream Control Transmission Protocol (SCTP) layer message over an interface of the CU and DU, and wherein the CU comprises a Radio Resource Control (RRC) layer and a Packet Data Convergence Protocol (PDCP) layer, and the DU comprises a Radio Link Control (RLC) layer, a Media Access Control layer and physical layer; and
sending, by the CU, the RRC message and the indication information to a distributed node (DU), wherein the indication information is external to the RRC message.

5. The method according to claim 4, wherein the SRB identifier is an SRB0, an SRB1, an SRB2, or an SRB3, and wherein the RRC message is a user-level RRC message rather than a cell-level RRC message.

6. The method according to claim 4, wherein
the sending, by the CU, the RRC message and the indication information to a distributed node DU comprises:
sending, by the CU, the RRC message and the indication information to the DU according to a CU-DU control plane protocol.

7. A node, comprising a processor, a communications circuit, and a transceiver, wherein the processor is communicatively coupled with the communications circuit and the transceiver and is configured to:
receive a Radio Resource Control (RRC) message and indication information from a central node (CU), wherein the indication information is external to the RRC message, and wherein the indication information comprises a signaling radio bearer (SRB) identifier that indicates an SRB type of the RRC message and a terminal identifier that indicates a terminal for the RRC message wherein the RRC message and the indication information are carried in a Stream Control Transmission Protocol (SCTP) layer message over an interface of the CU and DU, and wherein the CU comprises a Radio Resource Control (RRC) layer and a Packet Data Convergence Protocol (PDCP) layer, and the DU comprises a Radio Link Control (RLC) layer, a Media Access Control layer and physical layer; and
send the RRC message based on the SRB identifier and the terminal identifier.

8. The node according to claim 7, wherein
the SRB identifier is an SRB0, an SRB1, an SRB2, or an SRB3, and wherein the RRC message is a user-level RRC message rather than a cell-level RRC message.

9. The node according to claim 7, wherein the processor is configured to:
receive the RRC message and the indication information from the CU according to a CU-distributed node (DU) control plane protocol.

10. A node, comprising a processor and a communications circuit, wherein the processor is communicatively coupled with the communications circuit and is configured to:
obtain indication information associated with a Radio Resource Control (RRC) message, wherein the indication information is used to send the RRC message, and the indication information comprises a signaling radio bearer (SRB) identifier that indicates an SRB type of the RRC message and a terminal identifier that indicates a terminal for the RRC message, wherein the RRC message and the indication information are carried in a Stream Control Transmission Protocol (SCTP) layer message over an interface of the CU and DU, and wherein the CU comprises a Radio Resource Control (RRC) layer and a Packet Data Convergence Protocol (PDCP) layer, and the DU comprises a Radio Link Control (RLC) layer, a Media Access Control layer and physical layer; and
send the RRC message and the indication information to a distributed node (DU), wherein the indication information is external to the RRC message.

11. The node according to claim 10, wherein the SRB identifier is an SRB0, an SRB1, an SRB2, or an SRB3, and wherein the RRC message is a user-level RRC message rather than a cell-level RRC message.

12. The node according to claim 10, wherein
the processor is configured to send the RRC message and the indication information to the DU according to a central node (CU)-DU control plane protocol.

13. A communication system, comprising:
a central node (CU), configured to send a Radio Resource Control (RRC) message and indication information to a distributed node (DU), wherein the indication information is external to the RRC message, and wherein the indication information comprises a signaling radio bearer (SRB) identifier that indicates an SRB type of the RRC message and a terminal identifier that indicates a terminal for the RRC message, wherein the RRC message and the indication information are carried in a Stream Control Transmission Protocol (SCTP) layer message over an interface of the CU and DU, and wherein the CU comprises a Radio Resource Control (RRC) layer and a Packet Data Convergence Protocol (PDCP) layer, and the DU comprises a Radio Link Control (RLC) layer, a Media Access Control layer and physical layer; and
the DU, configured to send the RRC message based on the SRB identifier and the terminal identifier received from the CU.

14. The communication system according to claim 13, wherein the SRB identifier is an SRB0, an SRB1, an SRB2, or an SRB3, and wherein the RRC message is a user-level RRC message rather than a cell-level RRC message.

15. The communication system according to claim 13, wherein the RRC message and the indication information are transmitted between the CU and the DU according to a CU-DU control plane protocol.

* * * * *